US012487537B2

(12) United States Patent
Iida et al.

(10) Patent No.: US 12,487,537 B2
(45) Date of Patent: Dec. 2, 2025

(54) PARTICLE SET FOR PRODUCING PRINTED MATTER, APPARATUS FOR PRODUCING PRINTED MATTER, AND METHOD FOR PRODUCING PRINTED MATTER

(71) Applicant: FUJIFILM Business Innovation Corp., Tokyo (JP)

(72) Inventors: Yoshifumi Iida, Kanagawa (JP); Takashi Hasegawa, Kanagawa (JP); Satoshi Kamiwaki, Kanagawa (JP); Takako Kobayashi, Kanagawa (JP); Satoshi Inoue, Kanagawa (JP); Sumiaki Yamasaki, Kanagawa (JP); Mieko Seki, Kanagawa (JP); Kiyohiro Yamanaka, Kanagawa (JP); Takeshi Iwanaga, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 994 days.

(21) Appl. No.: 17/643,941

(22) Filed: Dec. 13, 2021

(65) Prior Publication Data

US 2022/0308486 A1 Sep. 29, 2022

(30) Foreign Application Priority Data

Mar. 26, 2021 (JP) ................................ 2021-054292
Sep. 27, 2021 (JP) ................................ 2021-157174

(51) Int. Cl.
*G03G 9/087* (2006.01)
*G03G 9/08* (2006.01)
(Continued)

(52) U.S. Cl.
CPC ....... *G03G 9/08711* (2013.01); *G03G 9/0804* (2013.01); *G03G 9/0819* (2013.01);
(Continued)

(58) Field of Classification Search
CPC ............. G03G 9/08711; G03G 9/0804; G03G 9/0819; G03G 9/0823; G03G 9/08755; G03G 9/0904; G03G 9/0906; G03G 13/20
See application file for complete search history.

(56) References Cited

U.S. PATENT DOCUMENTS

2010/0104967 A1* 4/2010 Ikeda .................... G03G 9/091 399/60
2013/0040236 A1* 2/2013 Fukushima .......... G03G 9/1075 399/222
(Continued)

FOREIGN PATENT DOCUMENTS

JP 2021-017465 A 2/2021

OTHER PUBLICATIONS

Extended European Search Report dated Jul. 7, 2022 in European Application No. 22154137.8.
(Continued)

*Primary Examiner* — Mark F. Huff
*Assistant Examiner* — Boone Alexander Evans
(74) *Attorney, Agent, or Firm* — Sughrue Mion, PLLC

(57) ABSTRACT

A particle set for producing a printed matter includes: a chromatic color toner containing toner particles A; and pressure-responsive particles containing base particles B, in which the base particles B contain a styrene resin containing, as polymerization components, styrene and a vinyl monomer other than styrene, and a (meth)acrylate resin containing, as a polymerization component, a (meth)acrylate, a mass ratio of the styrene resin to the (meth)acrylate resin (styrene resin:(meth)acrylate resin) is 80:20 to 20:80, a difference between the lowest glass transition temperature and the highest glass transition temperature of the pressure-responsive particles is 30° C. or more, and when the toner particles A have a volume average particle diameter D50A
(Continued)

and the base particles B have a volume average particle diameter D50B, the D50A and the D50B satisfy formula 1-1: 1.5 μm<(D50B−D50A).

10 Claims, 3 Drawing Sheets

(51) Int. Cl.
*G03G 9/09* (2006.01)
*G03G 13/20* (2006.01)

(52) U.S. Cl.
CPC ....... *G03G 9/0823* (2013.01); *G03G 9/08755* (2013.01); *G03G 9/0904* (2013.01); *G03G 9/0906* (2013.01); *G03G 13/20* (2013.01)

(56) References Cited

U.S. PATENT DOCUMENTS

| | | | | |
|---|---|---|---|---|
| 2018/0275544 | A1* | 9/2018 | Chonan | G03G 9/09364 |
| 2021/0017424 | A1 | 1/2021 | Ishizuka et al. | |
| 2021/0017429 | A1 | 1/2021 | Ishizuka et al. | |
| 2021/0018854 | A1* | 1/2021 | Ishizuka | G03G 9/09 |

OTHER PUBLICATIONS

Office Action issued Jun. 17, 2025 in Japanese Application No. 2021-157174.
Japanese Office Action dated Sep. 30, 2025, issued in Japanese application No. 2021-157174.

* cited by examiner

PARTICLE SET FOR PRODUCING PRINTED MATTER, APPARATUS FOR PRODUCING PRINTED MATTER, AND METHOD FOR PRODUCING PRINTED MATTER

CROSS-REFERENCE TO RELATED APPLICATIONS

This application is based on and claims priority under 35 USC 119 from Japanese Patent Application No. 2021-054292 filed Mar. 26, 2021 and Japanese Patent Application No. 2021-157174 filed Sep. 27, 2021.

BACKGROUND

(i) Technical Field

The present disclosure relates to a particle set for producing a printed matter, an apparatus for producing a printed matter, and a method for producing a printed matter.

(ii) Related Art

Japanese Unexamined Patent Application Publication No. 2021-017465 proposes an adhesive material that contains a styrene resin containing, as polymerization components, styrene and a vinyl monomer other than styrene, and a (meth)acrylate resin containing, as polymerization components, at least two (meth)acrylates that account for 90 mass % or more of all polymerization components of the (meth) acrylate resin, in which the mass ratio of the styrene resin to the (meth)acrylate resin is 80:20 to 20:80, and the adhesive material contains resin particles that have at least two glass transition temperatures, the lowest one of which is −30° C. or lower and the highest one of which is 30° C. or higher.

SUMMARY

Aspects of non-limiting embodiments of the present disclosure relate to a particle set for producing a printed matter, the particle set including a chromatic color toner containing toner particles A, and pressure-responsive particles containing base particles B, in which the base particles B contain a styrene resin containing, as polymerization components, styrene and a vinyl monomer other than styrene, and a (meth)acrylate resin containing, as a polymerization component, a (meth)acrylate, a mass ratio of the styrene resin to the (meth)acrylate resin (styrene resin:(meth)acrylate resin) is 80:20 to 20:80, and the difference between the lowest glass transition temperature and the highest glass transition temperature of the pressure-responsive particles is 30° C. or more, and this particle set can produce a printed matter having excellent adhesiveness compared to when a volume average particle diameter D50A of the toner particles A and the volume average particle diameter D50B of the base particles B satisfy formula C1-1: 1.5 μm≥(D50B−D50A).

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a particle set for producing a printed matter, the particle set including: a chromatic color toner containing toner particles A; and pressure-responsive particles containing base particles B, in which the base particles B contain a styrene resin containing, as polymerization components, styrene and a vinyl monomer other than styrene, and a (meth)acrylate resin containing, as a polymerization component, a (meth)acrylate, a mass ratio of the styrene resin to the (meth)acrylate resin (styrene resin:(meth)acrylate resin) is 80:20 to 20:80, a difference between the lowest glass transition temperature and the highest glass transition temperature of the pressure-responsive particles is 30° C. or more, and when the toner particles A have a volume average particle diameter D50A and the base particles B have a volume average particle diameter D50B, the D50A and the D50B satisfy formula 1-1: 1.5 μm<(D50B−D50A).

BRIEF DESCRIPTION OF THE DRAWINGS

Exemplary embodiments of the present disclosure will be described in detail based on the following figures, wherein.

DETAILED DESCRIPTION

Figure 1:
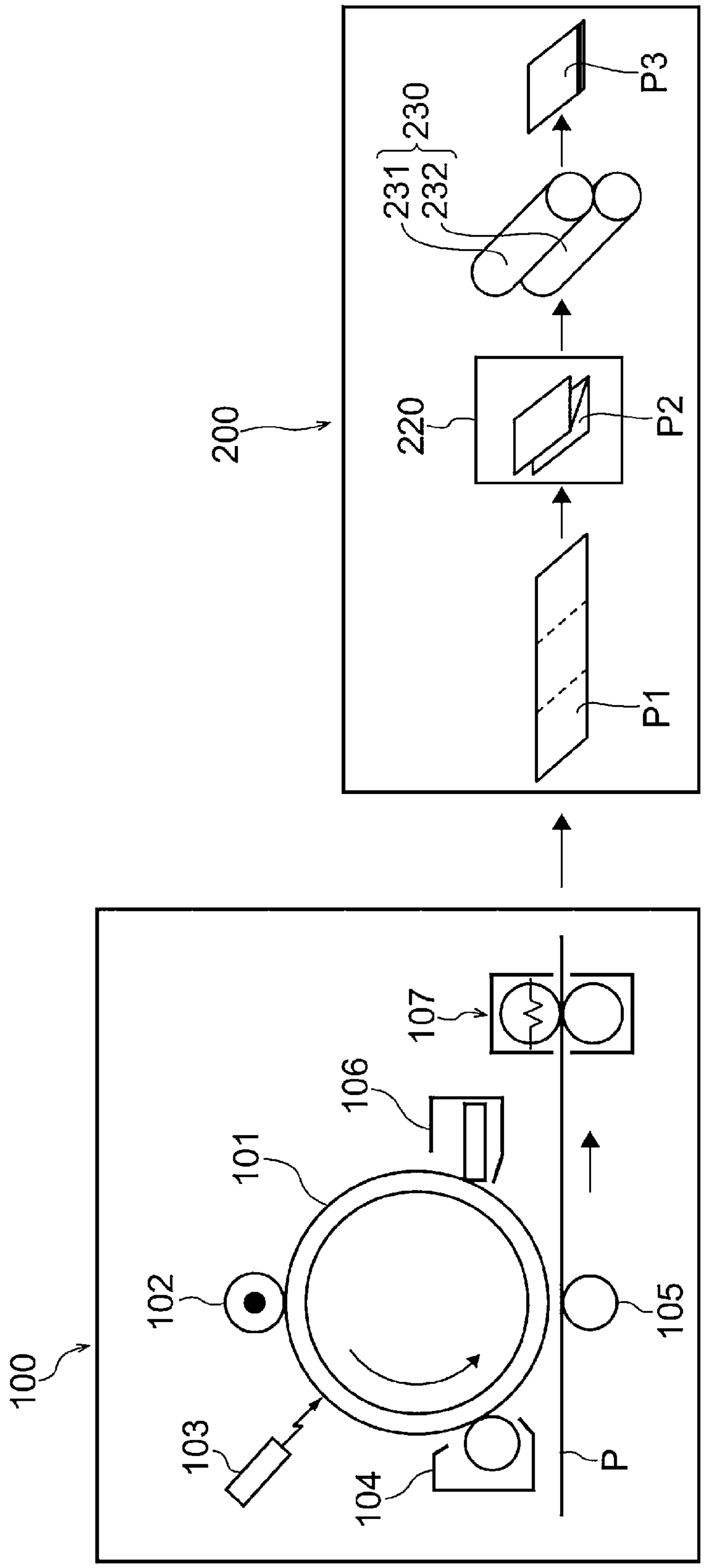
FIG. 1 is a schematic diagram illustrating a portion that includes an applying unit and a pressure bonding unit of one example of an apparatus for producing a printed matter according to an exemplary embodiment.

Exemplary embodiments, which are some of the examples of the present disclosure, will now be described. These descriptions and examples are merely illustrative and do not limit the scope of the present disclosure.

In this description, in numerical ranges described stepwise, the upper limit or the lower limit of one numerical range may be substituted with an upper limit or a lower limit of a different numerical range also described stepwise. In addition, in any numerical range described in the description, the upper limit or the lower limit of the numerical range may be substituted with a value indicated in Examples.

Each component may contain more than one corresponding substances.

When the amount of a component in a composition is described and when there are two or more substances that correspond to that component in the composition, the amount is the total amount of the two or more substances in the composition unless otherwise noted.

Particle Set for Producing Printed Matter

A particle set for producing a printed matter according to an exemplary embodiment includes a chromatic color toner containing toner particles A and pressure-responsive particles containing base particles B, and satisfies the following conditions:

- The base particles B contain a styrene resin containing, as polymerization components, styrene and a vinyl monomer other than styrene, and a (meth)acrylate resin containing, as a polymerization component, a (meth) acrylate.
- The mass ratio of the styrene resin to the (meth)acrylate resin (styrene resin:(meth)acrylate resin) is 80:20 to 20:80.
- The difference between the lowest glass transition temperature and the highest glass transition temperature of the pressure-responsive particles is 30° C. or more.

When the toner particles A have a volume average particle diameter D50A and the base particles B have a volume average particle diameter D50B, the D50A and the D50B satisfy formula 1-1 below:

$$1.5\ \mu m<(D50B-D50A) \quad \text{Formula 1-1:}$$

Due to the aforementioned features, a printed matter having excellent adhesiveness is obtained by using the particle set for producing a printed matter of the exemplary embodiment. The reasons for this are presumably as follows.

In some cases, a particle set for producing a printed matter is used in an electrophotographic image forming apparatus to simultaneously perform formation of an image by applying a chromatic color toner to a recording medium and formation of a pressure-responsive particle layer by applying pressure-responsive particles to the recording medium, the particle set containing a chromatic color toner containing toner particles A and pressure-responsive particles containing base particles B, in which the base particles B contain a styrene resin containing, as polymerization components, styrene and a vinyl monomer other than styrene, and a (meth)acrylate resin containing, as a polymerization component, a (meth)acrylate, the mass ratio of the styrene resin to the (meth)acrylate resin (styrene resin:(meth)acrylate resin) is 80:20 to 20:80, and the difference between the lowest glass transition temperature and the highest glass transition temperature of the pressure-responsive particles is 30° C. or more. Subsequently, the recording medium on which the image and the pressure-responsive particle layer have been formed may be stacked on another recording medium, and the stacked recording media may be pressure-bonded to induce phase transition in the pressure-responsive particle layer and to thereby bond the recording media to each other.

In such a case, if the thickness of the image formed of the chromatic color toner is equal to or greater than the thickness of the pressure-responsive particle layer, the pressure applied to the image during pressure-bonding of the recording media increases, and this sometimes decreases the pressure applied to the pressure-responsive particles. Thus, the printed matter to be obtained is expected to exhibit improved adhesiveness.

The particle set for producing a printed matter according to this exemplary embodiment satisfies that, when the toner particles A have a volume average particle diameter D50A and the base particles B have a volume average particle diameter D50B, the D50A and the D50B satisfy formula 1-1 described above. In other words, there is a relationship that the particle diameter of the base particles B contained in the pressure-responsive particles is larger than the particle diameter of the toner particles A contained in the chromatic color toner. Due to this relationship, when formation of an image by using a chromatic color toner and formation of a pressure-responsive particle layer by using pressure-responsive particles are performed on a recording medium simultaneously and then that recording medium is stacked onto another recording medium and pressure-bonded, the thickness of the pressure-responsive particle layer tends to be greater than the thickness of the image. Thus, the decrease in pressure applied to the pressure-responsive particles is suppressed.

Presumably due to this reason, a printed matter having excellent adhesiveness can be obtained by using the particle set for producing a printed matter according to this exemplary embodiment.

The particle set for producing a printed matter includes at least a chromatic color toner and pressure-responsive particles that have a pressure-induced phase transition property, and may further include, if necessary, other toners (for example, a transparent toner having no pressure-induced phase transition property). Hereinafter, the pressure-responsive particles having a pressure-induced phase transition property may simply be referred to as the "pressure-responsive particles".

The chromatic color toner may be formed of just one type of toner or a combination of multiple types of toners, and the pressure-responsive particles may be formed of just one type of pressure-responsive particles or a combination of multiple types of pressure-responsive particles.

Here, the "chromatic color toner" refers to a toner that contains more than 1.0 mass % of a coloring agent in the toner particles relative to the entirety of the toner particles. Furthermore, the "transparent toner" refers to a toner that contains toner particles not containing any coloring agent or that contains 1.0 mass % or less of a coloring agent in the toner particles relative to the entirety of the toner particles.

In addition, "having a pressure-induced phase transition property" means that the following formula 2 is satisfied.

$$10°\ C.\leq T1-T2 \quad \text{Formula 2:}$$

In formula 2, T1 represents a temperature at which a viscosity of 10000 Pa·s is exhibited at a pressure of 1 MPa, and T2 represents a temperature at which a viscosity of 10000 Pa·s is exhibited at a pressure of 10 MPa. The method for determining T1 and T2 is described below.

Hereinafter, the respective toners that constitute a particle set for producing a printed matter according to an exemplary embodiment are described.

Chromatic Color Toner

The chromatic color toner may be any toner that contains more than 1.0 mass % of a coloring agent in the toner particles A relative to the entirety of the toner particles A.

The chromatic color toner is formed of toner particles and, if needed, an external additive.

Toner Particles A

The toner particles A are formed of, for example, a binder resin, a coloring agent, and, if needed, a releasing agent and other additives.

Binder Resin

Examples of the binder resin include vinyl resins, for example, homopolymers obtained from monomers such as styrenes (for example, styrene, parachlorostyrene, and α-methylstyrene) (meth)acrylates (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacrylonitrile), vinyl ethers (for example, vinyl methyl ether and vinyl isobutyl ether), vinyl ketones (for example, vinyl methyl ketone, vinyl ethyl ketone, and vinyl isopropenyl ketone), and olefines (for example, ethylene, propylene, and butadiene), and copolymers obtained from two or more of these monomers.

Other examples of the binder resin include non-vinyl resins such as epoxy resins, polyester resins, polyurethane resins, polyamide resins, cellulose resins, polyether resins, and modified rosin, mixtures of these non-vinyl resins and the aforementioned vinyl resins, and graft polymers obtained by polymerizing a vinyl monomer in the presence of these resins.

These binder resins may be used alone or in combination.

The binder resin may be a polyester resin.

When a polyester resin is contained as the binder resin, a printed matter having better adhesiveness is obtained by using this particle set for producing a printed matter. The reasons for this are presumably as follows.

For example, when the toner particles A contain a styrene acryl resin, the toner particles A and the pressure-responsive particles are similar in their compositions, and thus become miscible during fixing, resulting in incorporation of the pressure-responsive particles into the toner particles A and degradation of adhesiveness. In contrast, when the toner particles A contain a polyester resin, the particles do not become miscible, incorporation of the pressure-responsive particles into the toner particles A is suppressed, and thus the pressure-responsive particles tend to remain separate from the toner particles A. Presumably as a result, it becomes easy to squash the pressure-responsive particles, and the adhesiveness is improved.

Examples of the polyester resin are polyester resins known in the art.

Examples of the polyester resins include polycondensation products formed between polycarboxylic acids and polyhydric alcohols. A commercially available product or a synthesized polyester resin may be used as the polyester resin.

Examples of the polycarboxylic acids include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (for example, cyclohexanedicarboxylic acid), aromatic dicarboxylic acids (for example, terephthalic acid, isophthalic acid, phthalic acid, and naphthalenedicarboxylic acid), anhydrides thereof, and lower (for example, having 1 or more and 5 or less carbon atoms) alkyl esters thereof. Among these, an aromatic dicarboxylic acid may be used as the polycarboxylic acid.

A combination of a dicarboxylic acid and a tricarboxylic or higher polycarboxylic acid having a crosslinked or branched structure may be used as the polycarboxylic acid. Examples of the tricarboxylic or higher polycarboxylic acid include trimellitic acid, pyromellitic acid, anhydrides thereof, and lower (for example, having 1 or more and 5 or less carbon atoms) alkyl esters thereof.

These polycarboxylic acids may be used alone or in combination.

Examples of the polyhydric alcohols include aliphatic diols (for example, ethylene glycol, diethylene glycol, triethylene glycol, propylene glycol, butanediol, hexanediol, and neopentyl glycol), alicyclic diols (for example, cyclohexanediol, cyclohexanedimethanol, and hydrogenated bisphenol A), and aromatic diols (for example, ethylene oxide adducts of bisphenol A and propylene oxide adducts of bisphenol A). Among these, aromatic diols and alicyclic diols are preferred, and aromatic diols are more preferred as the polyhydric alcohols.

A trihydric or higher polyhydric alcohol having a cross-linked structure or a branched structure may be used in combination with a diol as the polyhydric alcohol. Examples of the trihydric or higher polyhydric alcohol include glycerin, trimethylolpropane, and pentaerythritol.

These polyhydric alcohols may be used alone or in combination.

The glass transition temperature (Tg) of the polyester resin is preferably 50° C. or higher and 80° C. or lower, and more preferably 50° C. or higher and 65° C. or lower.

The glass transition temperature is determined from a DSC curve obtained by differential scanning calorimetry (DSC), more specifically, according to "extrapolated glass transition onset temperature" described in the method for determining the glass transition temperature in JIS K 7121: 1987 "Testing Methods for Transition Temperatures of Plastics".

The weight average molecular weight (Mw) of the polyester resin is preferably 5,000 or higher and 1,000,000 or lower, and more preferably 7,000 or higher and 500,000 or lower.

The number average molecular weight (Mn) of the polyester resin may be 2,000 or more and 100,000 or less.

The molecular weight distribution Mw/Mn of the polyester resin is preferably 1.5 or more and 100 or less, and more preferably 2 or more and 60 or less.

The weight average molecular weight and the number average molecular weight are measured by gel permeation chromatography (GPC). The molecular weight measurement by GPC involves using GPC•HLC-8120GPC produced by TOSOH CORPORATION as a measuring instrument with columns, TSKgel Super HM-M (15 cm) produced by TOSOH CORPORATION, and a THF solvent. The weight average molecular weight and the number average molecular weight are calculated from the measurement results by using the molecular weight calibration curves obtained from monodisperse polystyrene standard samples.

The polyester resin is obtained by a known production method. Specifically, for example, a polyester resin is obtained by performing a reaction at a polymerization temperature of 180° C. or higher and 230° C. or lower by optionally reducing the pressure inside the reaction system and by removing water and alcohols generated during condensation.

When the monomers used as raw materials do not dissolve or are not miscible at the reaction temperature, a high-boiling-point solvent may be used as a solubilizing agent to dissolve the monomers. In such a case, the polycondensation reaction is performed while distilling away the solubilizing agent. When there is a monomer that is poorly compatible, this poorly compatible monomer may be condensed in advance with an acid or an alcohol planned for polycondensation, and then the resulting product and other components may be subjected to polycondensation.

The binder resin content relative to the entirety of the toner particles A is preferably 40 mass % or more and 95 mass % or less, more preferably 50 mass % or more and 90 mass % or less, and yet more preferably 60 mass % or more and 85 mass % or less.

Coloring Agent

The amount of the coloring agent in the toner particles A exceeds 1.0 mass % relative to the entirety of the toner particles A.

Examples of the coloring agent include various pigments such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

These coloring agents may be used alone or in combination.

The coloring agent may be surface-treated if necessary, and may be used in combination with a dispersing agent. Multiple types of coloring agents may be used in combination.

The coloring agent content relative to the entirety of the toner particles A is preferably 1 mass % or more and 30 mass % or less and more preferably 3 mass % or more and 15 mass % or less.

Releasing Agent

Examples of the releasing agent include hydrocarbon wax, natural wax such as carnauba wax, rice wax, and candelilla wax, synthetic or mineral or petroleum wax such as montan wax, and ester wax such as fatty acid ester and montanic acid ester. The releasing agent is not limited to these.

The melting temperature of the releasing agent is preferably 50° C. or higher and 110° C. or lower, and more preferably 60° C. or higher and 100° C. or lower.

The melting temperature is determined from a DSC curve obtained by differential scanning calorimetry (DSC), more specifically, according to "Melting peak temperature" described in the method for determining the melting temperature in JIS K 7121:1987 "Testing Methods for Transition Temperatures of Plastics".

The releasing agent content relative to the entirety of the toner particles A is preferably 1 mass % or more and 20 mass % or less and more preferably 5 mass % or more and 15 mass % or less.

Other Additives

Examples of other additives include those known in the art such as a magnetic material, a charge controller, and inorganic powder. These additives are contained in the toner particles A as internal additives.

Properties and Other Features of Toner Particles A

The toner particles A may have a single layer structure or a core-shell structure constituted by a core (core particle) and a coating layer (shell layer) covering the core.

The toner particles A having a core-shell structure may be formed of, for example, a core containing a binder resin and other optional additives such as a coloring agent and a releasing agent, and a coating layer containing a binder resin.

External Additive

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)$ n, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobizing involves, for example, immersing inorganic particles in a hydrophobizing agent. The hydrophobizing agent may be any, and examples thereof include silane coupling agents, silicone oils, titanate coupling agents, and aluminum coupling agents. These agents may be used alone or in combination.

The amount of the hydrophobizing agent is, for example, typically 1 part by mass or more and 10 parts by mass or less relative to 100 parts by mass of the inorganic particles.

Other examples of the external additive include resin particles (resin particles of polystyrene, polymethyl methacrylate (PMMA), melamine resin, etc.), and cleaning activating agents (for example, particles of metal salts of higher aliphatic acids such as zinc stearate and fluorine high-molecular-weight materials).

The externally added amount of the external additive relative to the toner particles A is preferably 0.01 mass % or more and 5 mass % or less and is more preferably 0.01 mass % or more and 2.0 mass % or less.

Method for Producing Chromatic Color Toner

Next, a method for producing a chromatic color toner according to an exemplary embodiment is described.

The chromatic color toner of this exemplary embodiment is obtained by first producing the toner particles A and then externally adding an external additive to the toner particles A.

The toner particles A may be produced by a dry method (for example, a kneading and pulverizing method) or a wet method (for example, an aggregation and coalescence method, a suspension polymerization method, or a dissolution and suspension method). The method for producing the toner particles A may be any, and any known method may be employed.

For example, the toner particles A may be obtained by an aggregation and coalescence method.

Specifically, when the toner particles A are to be produced by an aggregation and coalescence method, the toner particles A are produced through a step of preparing a resin particle dispersion in which resin particles that will form a binder resin are dispersed (resin particle dispersion preparation step); a step of forming aggregated particles by aggregating resin particles (and, if necessary, other particles) in the resin particle dispersion (or, if necessary, in a dispersion prepared by mixing the resin particle dispersion and a dispersion of other particles) (aggregated particle forming step); and a step of forming toner particles A by heating an aggregated particle dispersion in which the aggregated particles are dispersed, and fusing and coalescing the aggregated particles (fusing and coalescing step).

These steps will now be described in detail.

Note that although a method for obtaining toner particles A containing a coloring agent and a releasing agent is described below, the coloring agent and the releasing agent are optional and used as necessary. Naturally, additives other than the coloring agent and the releasing agent may also be used.

Resin Particle Dispersion Preparation Step

First, a resin particle dispersion in which resin particles that will form a binder resin are dispersed, and, for example, a coloring agent particle dispersion in which coloring agent particles are dispersed and a releasing agent particle dispersion in which releasing agent particles are dispersed are prepared.

Here, the resin particle dispersion is prepared by, for example, dispersing resin particles in a dispersion medium using a surfactant.

An example of the dispersion medium used in the resin particle dispersion is an aqueous medium.

Examples of the aqueous medium include water such as distilled water and ion exchange water, and alcohols. These may be used alone or in combination.

Examples of the surfactant include anionic surfactants such as sulfate esters, sulfonates, phosphate esters, and soaps; cationic surfactants such as amine salts and quaternary ammonium salts; and nonionic surfactants such as polyethylene glycol, alkyl phenol-ethylene oxide adducts, and polyhydric alcohols. In particular, an anionic surfactant or a cationic surfactant may be used. A nonionic surfactant may be used in combination with an anionic surfactant or a cationic surfactant.

These surfactants may be used alone or in combination.

Examples of the method for dispersing the resin particles in the resin particle dispersion include typical dispersing methods that use a rotational shear-type homogenizer, or a mill that uses media such as a ball mill, a sand mill, or a dyno mill. Depending on the type of the resin particles, the resin particles may be dispersed in the resin particle dispersion by using a phase inversion emulsification method.

The phase inversion emulsification method is a method that involves dissolving a resin to be dispersed in a hydrophobic organic solvent that can dissolve the resin, adding a base to the organic continuous phase (0 phase) to neutralize, and adding a water medium (W phase) to the resulting product to perform W/O-to-O/W resin conversion (or phase inversion) to form a discontinuous phase and disperse the resin into particles in the water medium.

The volume average particle diameter of the resin particles dispersed in the resin particle dispersion is, for example, preferably 0.01 μm or more and 1 μm or less, more preferably 0.08 μm or more and 0.8 μm or less, and yet more preferably 0.1 μm or more and 0.6 μm or less.

The volume average particle diameter of the resin particles is determined by using a particle size distribution obtained by measurement with a laser diffraction particle size distribution meter (for example, LA-700 produced by Horiba Ltd.), drawing a cumulative distribution with respect to volume from the small diameter size relative to the divided particle size ranges (channels), and assuming the particle diameter at 50% accumulation relative to all particles as the volume average particle diameter D50v. The volume average particle diameters of other particles in other dispersions are also measured in a similar manner.

The resin particle content in the resin particle dispersion is preferably 5 mass % or more and 50 mass % or less and is more preferably 10 mass % or more and 40 mass % or less.

The coloring agent particle dispersion and the releasing agent particle dispersion are prepared by a method similar to that of the resin particle dispersion. In other words, the volume average particle diameter, the dispersion medium, the dispersing method, and the particle content for the particles in the resin particle dispersion are the same as those for the coloring agent particles dispersed in the coloring agent particle dispersion and the releasing agent particles dispersed in the releasing agent particle dispersion.

Aggregated Particle Forming Step

Next, the resin particle dispersion, the coloring agent particle dispersion, and the releasing agent particle dispersion are mixed.

In the mixed dispersion, the resin particles, the coloring agent particles, and the releasing agent particles are subjected to hetero aggregation to form aggregated particles that have diameters close to the target diameter of the toner particles A and that contain the resin particles, the coloring agent particles, and the releasing agent particles.

Specifically, for example, an aggregating agent is added to the mixed dispersion, the pH of the mixed dispersion is adjusted to acidic (for example, a pH of 2 or more and 5 or less), and a dispersion stabilizer is added as necessary. Then the resulting mixture is heated to a temperature close to the glass transition temperature of the resin particles (specifically, for example, a temperature 10° C. to 30° C. lower than the glass transition temperature of the resin particles) so as to aggregate the particles dispersed in the mixed dispersion and to thereby form aggregated particles.

In the aggregated particle forming step, for example, the aforementioned heating may be performed after adding the aggregating agent while stirring the mixed dispersion with a rotational shear-type homogenizer at room temperature (for example, 25° C.), adjusting the pH of the mixed dispersion to acidic (for example, a pH of 2 or more and 5 or less), and adding a dispersion stabilizer as needed.

Examples of the aggregating agent include a surfactant having an opposite polarity to the surfactant used as the dispersing agent added to the mixed dispersion, an inorganic metal salt, and a divalent or higher valent metal complex. In particular, when a metal complex is used as the aggregating agent, the amount of the surfactant used is reduced, and the charge properties are improved.

An additive that forms a complex with a metal ion in the aggregating agent or that forms a similar bond therewith may be used as needed. An example of such an additive is a chelating agent.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less and more preferably 0.1 parts by mass or more and less than 3.0 parts by mass relative to 100 parts by mass of the resin particles, for example.

Fusing and Coalescing Step

Next, the aggregated particle dispersion in which the aggregated particles are dispersed is heated to, for example, a temperature equal to or higher than the glass transition temperature of the resin particles (for example, a temperature 10 to 30° C. higher than the glass transition temperature of the resin particles) to fuse and coalesce the aggregated particles and form toner particles A.

The toner particles A are obtained through the aforementioned steps.

Alternatively, toner particles A may be produced by further performing, after obtaining the aggregated particle dispersion in which the aggregated particles are dispersed, a step of forming second aggregated particles by mixing the aggregated particle dispersion with a resin particle dispersion in which resin particles are dispersed so that the resin particles additionally adhere to the surfaces of the aggregated particles, and a step of forming toner particles A having a core/shell structure by heating a second aggregated particle dispersion in which the second aggregated particles are dispersed so as to fuse and coalesce the second aggregated particles.

Here, after completion of the fusing and coalescing step, the toner particles A formed in the solution are subjected to a washing step, a solid-liquid separation step, and a drying step known in the art so as to obtain dry toner particles A.

From the viewpoint of chargeability, the washing step may involve thorough displacement washing using ion exchange water. The solid-liquid separation step is not particularly limited; however, from the viewpoint of productivity, suction filtration, pressure filtration, or the like may be performed. The drying step is also not particularly limited; however, from the viewpoint of productivity, freeze-drying, flash-drying, fluid-drying, vibration-type fluid-drying, or the like may be performed.

The chromatic color toner of the exemplary embodiment is produced, for example, by adding an external additive to the obtained dry toner particles A and mixing the resulting mixture. Mixing may be performed by using a V blender, a HENSCHEL mixer, a Lodige mixer, or the like, for example. Furthermore, if needed, a vibrating screen, an air screen, or the like may be used to remove coarse particles from the chromatic color toner.

Pressure-Responsive Particles

The pressure-responsive particles contain at least base particles B, and, if needed, an external additive.

Base Particles B

The base particles B contain at least a binder resin. The binder resin contains a styrene resin that contains, as polymerization components, styrene and a vinyl monomer other than styrene, and a (meth)acrylate resin that contains, as a polymerization component, a (meth)acrylate.

The base particles B may further contain a coloring agent, a releasing agent, and other additives.

When the base particles B contain a coloring agent, the amount of the coloring agent in the base particles B relative to the entirety of the base particles B is 1.0 mass % or less.

Styrene Resin

The styrene resin contains, as polymerization components, styrene and a vinyl monomer other than styrene.

From the viewpoint of suppressing fluidization of the base particles B in an unpressured state, the mass ratio of styrene relative to the total of the polymerization components of the styrene resin is preferably 60 mass % or more, more preferably 70 mass % or more, and yet more preferably 75 mass % or more. From the viewpoint of forming base particles B that easily undergo phase transition under pressure, the mass ratio is preferably 95 mass % or less, more preferably 90 mass % or less, and yet more preferably 85 mass % or less.

Examples of the styrene monomers other than styrene include vinyl naphthalene; alkyl-substituted styrenes such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene, 3,4-dichlorostyrene, p-fluorostyrene, and 2,5-difluorostyrene; and nitro-substituted styrenes such as m-nitrostyrene, o-nitrostyrene, and p-nitrostyrene. These styrene monomers may be used alone or in combination.

The acryl monomer may be at least one acryl monomer selected from the group consisting of (meth)acrylic acid and (meth)acrylates. Examples of the (meth)acrylate include alkyl (meth)acrylates, carboxy-substituted alkyl (meth)acrylates, hydroxy-substituted alkyl (meth)acrylates, alkoxy-substituted alkyl (meth)acrylates, and di(meth)acrylates. These acryl monomers may be used alone or in combination.

Examples of the alkyl (meth)acrylates include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth) acrylate, lauryl (meth)acrylate, stearyl (meth)acrylate, cyclohexyl (meth)acrylate, dicyclopentanyl (meth)acrylate, and isobornyl (meth)acrylate.

An example of the carboxy-substituted alkyl (meth)acrylates is 2-carboxylethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the alkoxy-substituted alkyl (meth)acrylates is 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth) acrylate, nonanediol di(meth)acrylate, and decanediol di(meth)acrylate.

Examples of the (meth)acrylates also include 2-(diethylamino)ethyl (meth)acrylate, benzyl (meth)acrylate, and methoxypolyethylene glycol (meth)acrylate.

Examples of other vinyl monomer constituting the styrene resin include, in addition to the styrene monomers and acryl monomers, (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefines such as isoprene, butene, and butadiene.

The styrene resin preferably contains, as a vinyl monomer other than styrene, a (meth)acrylate, more preferably an alkyl (meth)acrylate, yet more preferably an alkyl (meth) acrylate in which the alkyl group contains 2 to 10 carbon atoms, still more preferably an alkyl (meth)acrylate in which the alkyl group contains 4 to 8 carbon atoms, and particularly preferably at least one of n-butyl acrylate and 2-ethylhexyl acrylate. The styrene resin and the (meth)acrylate resin may contain the same (meth)acrylate as a polymerization component.

From the viewpoint of suppressing fluidization of the base particles B in an unpressured state, the mass ratio of the (meth)acrylate relative to the total of the polymerization components of the styrene resin is preferably 40 mass % or less, more preferably 30 mass % or less, and yet more preferably 25 mass % or less. From the viewpoint of forming base particles B that easily undergo phase transition under pressure, the mass ratio is preferably 5 mass % or more, more preferably 10 mass % or more, and yet more preferably 15 mass % or more. The (meth)acrylate here is preferably an alkyl (meth)acrylate, yet more preferably an alkyl (meth) acrylate in which the alkyl group contains 2 or more and 10 or less carbon atoms, and still more preferably an alkyl (meth)acrylate in which the alkyl group contains 4 or more and 8 or less carbon atoms.

The styrene resin particularly preferably contains, as a polymerization component, at least one of n-butyl acrylate and 2-ethylhexyl acrylate, and the total amount of n-butyl acrylate and 2-ethylhexyl acrylate relative to the total of the polymerization components of the styrene resin is preferably 40 mass % or less, more preferably 30 mass % or less, and yet more preferably 25 mass % or less from the viewpoint of suppressing fluidization of the base particles B in an unpressured state. From the viewpoint of forming base particles B that easily undergo phase transition under pressure, the total amount is preferably 5 mass % or more, more preferably 10 mass % or more, and yet more preferably 15 mass % or more.

From the viewpoint of suppressing fluidization of the base particles B in an unpressured state, the weight average molecular weight of the styrene resin is preferably 3,000 or more, more preferably 4,000 or more, and yet more preferably 5,000 or more. From the viewpoint of forming base particles B that easily undergo phase transition under pressure, the weight average molecular weight is preferably 50,000 or less, more preferably 45,000 or less, and yet more preferably 40,000 or less.

From the viewpoint of suppressing fluidization of the base particles B in an unpressured state, the glass transition temperature of the styrene resin is preferably 30° C. or higher, more preferably 40° C. or higher, and yet more preferably 50° C. or higher. From the viewpoint of forming base particles B that easily undergo phase transition under pressure, the glass transition temperature is preferably 110° C. or lower, more preferably 100° C. or lower, and yet more preferably 90° C. or lower.

In the present disclosure, the glass transition temperature of a resin is determined from a differential scanning calorimetry curve (DSC curve) obtained by performing differential scanning calorimetry (DSC). More specifically, the glass transition temperature is determined from the "extrapolated glass transition onset temperature" described in the method for determining the glass transition temperature in JIS K 7121:1987 "Testing Methods for Transition Temperatures of Plastics".

The glass transition temperature of a resin is controlled by the types of polymerization components and the polymerization ratios. The glass transition temperature has a tendency to decrease as the density of flexible units, such as a methylene group, an ethylene group, and an oxyethylene group, contained in the main chain increases, and has a tendency to increase as the density of rigid units, such as aromatic rings and cyclohexane rings, contained in the main chain increases. Moreover, the glass transition temperature has a tendency to decrease as the density of aliphatic groups in side chains increases.

From the viewpoint of suppressing fluidization of the base particles B in an unpressured state, the styrene resin preferably accounts for 55 mass % or more, more preferably 60 mass % or more, and yet more preferably 65 mass % or more of the entirety of the base particles B. From the viewpoint of forming base particles B that easily undergo phase transition under pressure, the styrene resin preferably accounts for 80 mass % or less, more preferably 75 mass % or less, and yet more preferably 70 mass % or less.

(Meth)acrylate Resin

The (meth)acrylate resin contains a (meth)acrylate as a polymerization component.

The (meth)acrylate preferably accounts for 90 mass % or more, preferably 95 mass % or more, more preferably 98 mass % or more, and yet more preferably 100 mass % of all polymerization components of the (meth)acrylate resin.

Examples of the (meth)acrylate include alkyl (meth) acrylates, carboxy-substituted alkyl (meth)acrylates, hydroxy-substituted alkyl (meth)acrylates, alkoxy-substituted alkyl (meth)acrylates, and di(meth)acrylates.

Examples of the alkyl (meth)acrylates include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth) acrylate, lauryl (meth)acrylate, stearyl (meth)acrylate, cyclohexyl (meth)acrylate, dicyclopentanyl (meth)acrylate, and isobornyl (meth)acrylate.

An example of the carboxy-substituted alkyl (meth)acrylates is 2-carboxylethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the alkoxy-substituted alkyl (meth)acrylates is 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth) acrylate, nonanediol di(meth)acrylate, and decanediol di(meth)acrylate.

Examples of the (meth)acrylates also include 2-(diethylamino)ethyl (meth)acrylate, benzyl (meth)acrylate, and methoxypolyethylene glycol (meth)acrylate.

These (meth)acrylates may be used alone or in combination.

From the viewpoint of forming base particles B that easily undergo phase transition under pressure and exhibit excellent adhesiveness, the (meth)acrylate is preferably an alkyl (meth)acrylate, yet more preferably an alkyl (meth)acrylate in which the alkyl group contains 2 or more and 10 or less carbon atoms, more preferably an alkyl (meth)acrylate in which the alkyl group contains 4 or more and 8 or less carbon atoms, and particularly preferably n-butyl acrylate and 2-ethylhexyl acrylate. From the viewpoint of forming base particles B that easily undergo phase transition under pressure, the styrene resin and the (meth)acrylate resin may contain the same (meth)acrylate as a polymerization component.

From the viewpoint of forming base particles B that easily undergo phase transition under pressure and exhibit excellent adhesiveness, the alkyl (meth)acrylate preferably accounts for 90 mass % or more, more preferably 95 mass % or more, yet more preferably 98 mass % or more, and still more preferably 100 mass % of all polymerization components of the (meth)acrylate resin. The alkyl (meth)acrylate here is preferably an alkyl (meth)acrylate in which the alkyl group contains 2 or more and 10 or less carbon atoms and more preferably an alkyl (meth)acrylate in which the alkyl group contains 4 or more and 8 or less carbon atoms.

The (meth)acrylate resin may contain at least two (meth) acrylates as polymerization components.

When the (meth)acrylate resin contains, as polymerization components, at least two (meth)acrylates, from the viewpoint of forming base particles B that easily undergo phase transition under pressure and exhibit excellent adhesiveness, the mass ratio of two (meth)acrylates having the largest and second-largest mass ratios among the at least two (meth)acrylates contained as the polymerization components in the (meth)acrylate resin is preferably 80:20 to 20:80, more preferably 70:30 to 30:70, and yet more preferably 60:40 to 40:60.

When the (meth)acrylate resin contains, as polymerization components, at least two (meth)acrylates, the two (meth)acrylates having the largest and second-largest mass ratios among the at least two (meth)acrylates contained as the polymerization components in the (meth)acrylate resin may be alkyl (meth)acrylates. The alkyl (meth)acrylate here is preferably an alkyl (meth)acrylate in which the alkyl group contains 2 or more and 10 or less carbon atoms and more preferably an alkyl (meth)acrylate in which the alkyl group contains 4 or more and 8 or less carbon atoms.

When the (meth)acrylate resin contains, as polymerization components, at least two (meth)acrylates, and the two (meth)acrylates having the largest and second-largest mass ratios among the at least two (meth)acrylates contained as the polymerization components in the (meth)acrylate resin are alkyl (meth)acrylates, the difference in the number of carbon atoms in the alkyl group between these two alkyl (meth)acrylates is, from the viewpoint of forming base particles B that easily undergo phase transition under pressure and exhibit excellent adhesiveness, 1 or more and 4 or less, more preferably 2 or more and 4 or less, and yet more preferably 3 or 4.

From the viewpoint of forming base particles B that easily undergo phase transition under pressure and exhibit excellent adhesiveness, the (meth)acrylate resin preferably contains, as polymerization components, n-butyl acrylate and 2-ethylhexyl acrylate. In particular, the two (meth)acrylates having the largest and second-largest mass ratios among the at least two (meth)acrylates contained as polymerization components in the (meth)acrylate resin are preferably n-butyl acrylate and 2-ethylhexyl acrylate. The total amount of n-butyl acrylate and 2-ethylhexyl acrylate relative to all polymerization components of the (meth)acrylate resin is preferably 90 mass % or more, more preferably 95 mass % or more, yet more preferably 98 mass % or more, and still more preferably 100 mass %.

The (meth)acrylate resin may further contain, as polymerization components, vinyl monomers other than (meth) acrylates. Examples of the vinyl monomers other than the (meth)acrylates include (meth)acrylic acid; styrene; styrene monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefines such as isoprene, butene, and butadiene. These vinyl monomers may be used alone or in combination.

When the (meth)acrylate resin contains a vinyl monomer other than (meth)acrylates as polymerization components, the vinyl monomer other than the (meth)acrylates is preferably at least one of acrylic acid and methacrylic acid and is more preferably acrylic acid.

From the viewpoint of suppressing fluidization of the base particles B in an unpressured state, the weight average molecular weight of the (meth)acrylate resin is preferably 100,000 or more, more preferably 120,000 or more, and yet more preferably 150,000 or more. From the viewpoint of forming base particles B that easily undergo phase transition under pressure, the weight average molecular weight is preferably 250,000 or less, more preferably 220,000 or less, and yet more preferably 200,000 or less.

From the viewpoint of forming base particles B that easily undergo phase transition under pressure, the glass transition temperature of the (meth)acrylate resin is preferably 10° C. or lower, more preferably 0° C. or lower, and yet more preferably −10° C. or lower. From the viewpoint of suppressing fluidization of the base particles B in an unpressured state, the glass transition temperature is preferably −90° C. or higher, more preferably −80° C. or higher, and yet more preferably −70° C. or higher.

From the viewpoint of forming base particles B that easily undergo phase transition under pressure, the mass ratio of the (meth)acrylate resin relative to the entirety of the base particles B is preferably 20 mass % or more, more preferably 25 mass % or more, and yet more preferably 30 mass % or more. From the viewpoint of suppressing fluidization of the base particles B in an unpressured state, the mass ratio is preferably 45 mass % or less, more preferably 40 mass % or less, and yet more preferably 35 mass % or less.

The total amount of the styrene resin and the (meth) acrylate resin contained in the base particles B relative to the entirety of the base particles B is preferably 70 mass % or more, more preferably 80 mass % or more, yet more preferably 90 mass % or more, still preferably 95 mass % or more, and most preferably 100 mass %.

Mass Ratio of Styrene Resin to (meth)acrylate Resin

The mass ratio of the styrene resin to the (meth)acrylate resin (styrene resin:(meth)acrylate resin) is 80:20 to 20:80.

From the viewpoint of forming a particle set for producing a printed matter that exhibits better adhesiveness, the mass ratio of the styrene resin to the (meth)acrylate resin (styrene resin:(meth)acrylate resin) is preferably 75:25 to 25:75, more preferably 70:30 to 30:70, and yet more preferably 65:35 to 35:65.

Other Resins

The base particles B may further contain, for example, a non-vinyl resin such as a polystyrene:epoxy resin, a polyester resin, a polyurethane resin, a polyamide resin, a cellulose resin, a polyether resin, or modified rosin. These resins may be used alone or in combination.

Coloring Agent

The base particles B may further contain a coloring agent.

Examples of the coloring agent contained in the base particles B include pigments and dyes.

From the viewpoint of obtaining a particle set for producing a printed matter that has better adhesiveness, the coloring agent contained in the base particles B may be a pigment.

From the viewpoints of improving the interaction with the coloring agent contained in the toner particles A and obtaining a particle set for producing a printed matter that has better adhesiveness, the pigment contained in the base particles B may be a pigment that contains at least one selected from the group consisting of a pigment having a heteroring, a pigment having an amino group, a pigment containing an amide group, a pigment having a hydroxy group, and a pigment having a carboxy group.

Examples of the cyan pigment include C.I. Pigment Blue 1, 2, 3, 4, 5, 6, 7, 10, 11, 12, 13, 14, 15, 15:1, 15:2, 15:3, 15:4, 15:6, 16, 17, 23, 60, 65, 73, 83, and 180, C.I. Vat Cyan 1, 3, and 20, navy blue, cobalt blue, alkaline blue lake, phthalocyanine blue, metal-free phthalocyanine blue, partially chlorinated phthalocyanine blue, Fast Sky Blue, and Indanthrene Blue BC.

From the viewpoint of obtaining a particle set for producing a printed matter that has better adhesiveness, the cyan pigment may have a phthalocyanine skeleton.

The cyan pigment that has a phthalocyanine skeleton may be at least one selected from the group consisting C.I. Pigment Blue 1, 2, 3, 4, 5, 6, 7, 10, 11, 12, 13, 14, 15, 15:1, 15:2, 15:3, 15:4, 15:6, 16, 17, 23, 60, 65, 73, 83, and 180, phthalocyanine blue, metal-free phthalocyanine blue, and partially chlorinated phthalocyanine blue.

Examples of the magenta coloring agent include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 146, 147, 150, 163, 176, 184, 185, 202, 206, 207, 209, 238, and 269, and Pigment Violet 19.

From the viewpoint of obtaining a particle set for producing a printed matter that has better adhesiveness, the magenta pigment may contain an amino group.

The magenta pigment that contains an amino group may contain at least one selected from the group consisting of C.I. Pigment Red 122, C.I. Pigment Red 185, and C.I. Pigment Red 238.

Examples of the yellow coloring agent include C.I. Pigment Yellow 2, 3, 15, 16, 17, 74, 97, 180, 185, and 139.

From the viewpoint of obtaining a particle set for producing a printed matter that has better adhesiveness, the yellow pigment may contain an amide group.

The yellow pigment that contains an amide group may contain at least one selected from the group consisting of C.I. Pigment Yellow 3, 15, 16, 17, 74, 97, 180, and 185.

Examples of the black pigment include carbon black, copper oxide, manganese dioxide, aniline black, and activated carbon.

From the viewpoints of forming a particle set for producing a printed matter that has better adhesiveness, the black pigment preferably contains at least one pigment group selected from the group consisting of a hydroxy group and a carboxy group, and is more preferably carbon black.

The base particles B may contain a pigment, and the amount of the pigment in the base particles B relative to the entirety of the base particles B is preferably 5 ppm or more and 100 ppm or less, more preferably 10 ppm or more and 97 ppm or less, and yet more preferably 15 ppm or more and 95 ppm or less.

By setting the amount of the pigment contained in the base particles B to 5 ppm or more and 100 ppm or less relative to the entirety of the base particles B, a particle set for producing a printed matter that has better adhesiveness can be easily obtained.

The reason for this is not exactly clear, but, presumably, the interaction between the polar groups (for example, heteroatoms in the heteroring, amino groups, amide groups, hydroxy groups, carboxy groups, etc.) in the pigment contained in the base particles B and the polar groups contained in the coloring agent contained in the toner particles A further increases the aggregation force between the base particles B and the toner particles A.

The pigment content in the base particles B is measured as follows, for example.

The pigment content can be determined by combining analyses such as gas chromatography mass spectroscopy (GC-MS), thermogravimetry differential temperature analysis (TG-DTA), inductively coupled plasma optical emission spectroscopy (ICP-OES), inductively coupled plasma atomic emission spectroscopy (ICP-AES), and inductively coupled plasma mass spectroscopy (ICP-MS).

Various Additives

The base particles B may further contain a releasing agent, a charge controller, and the like, as needed.

Examples of the releasing agent include those that are used in the chromatic color toner.

Structure of Base Particles B

The base particles B may have a single layer structure or a core-shell structure constituted by a core and a shell layer covering the core. From the viewpoint of suppressing fluidization of the pressure-responsive particles in an unpressured state and from the viewpoint of forming a particle set for producing a printed matter that has better adhesiveness, the base particles B may have a core-shell structure.

When the base particles B have a core-shell structure, from the viewpoint of facilitating phase transition under pressure, the core may contain a styrene resin and a (meth) acrylate resin. From the viewpoint of suppressing fluidization of the pressure-responsive particles in an unpressured state, the shell layer may contain a styrene resin. Specific examples of the styrene resin are as described above. Specific examples of the (meth)acrylate resin are as described above.

Examples of the resin contained in the shell layer include non-vinyl resins such as a polystyrene:epoxy resin, a polyester resin, a polyurethane resin, a polyamide resin, a cellulose resin, a polyether resin, and modified rosin. These resins may be used alone or in combination.

From the viewpoint of suppressing deformation of the base particles B, the average thickness of the shell layer is preferably 120 nm or more, more preferably 130 nm or more, and yet more preferably 140 nm or more, and from the viewpoint of facilitating phase transition of the base particles B under pressure, the average thickness is preferably 550 nm or less, more preferably 500 nm or less, and yet more preferably 400 nm or less.

The average thickness of the shell layer is measured by the following method.

The pressure-responsive particles are embedded in an epoxy resin, a section is prepared by using a diamond knife or the like, and the section is stained with osmium tetroxide or ruthenium tetroxide in a desiccator. The stained section is observed with a scanning electron microscope (SEM). From the SEM image, sections of ten base particles B are selected at random, the thickness of the shell layer is measured at 20 positions for each of the base particles B to yield an average value, and the average value of ten base particles B is assumed to be the average thickness.

From the viewpoint of suppressing offset during thermal fixing, the weight average molecular weight of the base particles B is preferably 10,000 or more, more preferably 20,000 or more, and yet more preferably 50,000 or more. From the viewpoint of achieving both suppression of offset during thermal fixing and the pressure-bonding property, the weight average molecular weight is preferably 250,000 or less, more preferably 200,000 or less, and yet more preferably 150,000 or less.

From the viewpoint of suppressing offset during thermal fixing, the number average molecular weight of the base particles B is preferably 5,000 or more, more preferably 8,000 or more, and yet more preferably 10,000 or more. From the viewpoint of achieving both suppression of offset during thermal fixing and the pressure-bonding property, the number average molecular weight is preferably 50,000 or less, more preferably 40,000 or less, and yet more preferably 30,000 or less.

External Additive

Examples of the external additive include those that are used in the chromatic color toner.

The externally added amount of the external additive relative to the base particles B is preferably 0.01 mass % or more and 5 mass % or less and is more preferably 0.01 mass % or more and 2.0 mass % or less.

Properties of Pressure-Responsive Particles

Glass Transition Temperature

The pressure-responsive particles of this exemplary embodiment has at least two glass transition temperatures, and the difference between the lowest glass transition temperature and the highest glass transition temperature is 30° C. or more. One of the glass transition temperatures is presumed to be that of the styrene resin, and the other one of the glass transition temperatures is presumed to be that of the (meth)acrylate resin.

The pressure-responsive particles may have three or more glass transition temperatures; however, the number of glass transition temperatures is preferably two. Examples of the case in which there are two glass transition temperatures include the case in which a styrene resin and a (meth) acrylate resin are the only resins contained in the pressure-responsive particles, and the case in which the amount of resins other than the styrene resin and the (meth)acrylate resin is small (for example, the amount of other resins is 5 mass % or less relative to the entirety of the pressure-responsive particles).

From the viewpoint of facilitating phase transition of the pressure-responsive particles under pressure, the difference between the lowest glass transition temperature and the highest glass transition temperature is more preferably 40° C. or more, yet more preferably 50° C. or more, and still more preferably 60° C. or more. The upper limit of the difference between the lowest glass transition temperature and the highest glass transition temperature is, for example, 140° C. or less, and may be 130° C. or less or 120° C. or less.

From the viewpoint of facilitating phase transition of the pressure-responsive particles under pressure, the lowest glass transition temperature of the pressure-responsive particles is preferably 10° C. or lower, more preferably 0° C. or lower, and yet more preferably −10° C. or lower. From the viewpoint of suppressing fluidization of the pressure-responsive particles in an unpressured state, the lowest glass transition temperature is preferably −90° C. or higher, more preferably −80° C. or higher, and yet more preferably −70° C. or higher.

From the viewpoint of suppressing fluidization of the pressure-responsive particles in an unpressured state, the highest glass transition temperature of the pressure-responsive particles is preferably 30° C. or higher, more preferably 40° C. or higher, and yet more preferably 50° C. or higher. From the viewpoint of facilitating phase transition of the pressure-responsive particles under pressure, the highest glass transition temperature is preferably 70° C. or lower, more preferably 65° C. or lower, and yet more preferably 60° C. or lower.

In the present disclosure, the glass transition temperatures of the pressure-responsive particles are determined from a differential scanning calorimetry curve (DSC curve) obtained by performing differential scanning calorimetry (DSC) on a plate-shaped sample obtained by compressing the pressure-responsive particles. More specifically, the glass transition temperatures are determined from the "extrapolated glass transition onset temperature" described in the method for determining the glass transition temperature in JIS K 7121:1987 "Testing Methods for Transition Temperatures of Plastics".

Pressure-Induced Phase Transition Property

The pressure-responsive particles are particles that undergo phase transition under pressure, and satisfy the following formula 2.

$$10° \text{ C.} \leq T1 - T2 \qquad \text{Formula 2:}$$

In formula 2, T1 represents a temperature at which a viscosity of 10000 Pa·s is exhibited at a pressure of 1 MPa, and T2 represents a temperature at which a viscosity of 10000 Pa·s is exhibited at a pressure of 10 MPa.

From the viewpoint of facilitating phase transition of the pressure-responsive particles under pressure, the temperature difference (T1−T2) is preferably 10° C. or more, more preferably 15° C. or more, and yet more preferably 20° C. or more. From the viewpoint of suppressing fluidization of the pressure-responsive particles in an unpressured state, the temperature difference (T1−T2) is preferably 120° C. or less, more preferably 100° C. or less, and yet more preferably 80° C. or less.

The temperature T1 is preferably 140° C. or lower, more preferably 130° C. or lower, yet more preferably 120° C. or lower, and particularly preferably 115° C. or lower.

The temperature T2 is preferably 40° C. or higher, more preferably 50° C. or higher, and yet more preferably 60° C. or higher. The upper limit of the temperature T2 may be 85° C. or lower.

One indicator of how easily the pressure-responsive particles undergo phase transition under pressure is the temperature difference (T1−T3), which is the difference between the temperature T1 at which a viscosity of 10000 Pa·s is exhibited at a pressure of 1 MPa and the temperature T3 at which a viscosity of 10000 Pa·s is exhibited at a pressure of 4 MPa, and this temperature difference (T1−T3) may be 5° C. or more. From the viewpoint of ease of pressure-induced phase transition, the pressure-responsive particles preferably have a temperature difference (T1−T3) of 5° C. or more and more preferably 10° C. or more.

The temperature difference (T1−T3) is typically 25° C. or less.

From the viewpoint of adjusting the temperature difference (T1−T3) to 5° C. or more, the temperature T3 at which a viscosity of 10000 Pa·s is exhibited at a pressure of 4 MPa is preferably 90° C. or higher, more preferably 85° C. or higher, and yet more preferably 80° C. or higher. The lower limit of the temperature T3 may be 60° C. or higher.

The method for determining the temperature T1, the temperature T2, and the temperature T3 is as follows.

Particles to be measured are compressed into a pellet-shaped sample. The pellet-shaped sample is placed in a Flowtester (CFT-500 produced by Shimadzu Corporation), the applied pressure is fixed at 1 MPa, and the viscosity at 1 MPa relative to the temperature is measured. From the obtained viscosity graph, the temperature T1 at which the viscosity is $10^4$ Pa·s at an applied pressure of 1 MPa is determined. The temperature T2 is determined by the same method for determining the temperature T1 except that the applied pressure is changed from 1 MPa to 10 MPa. The temperature T3 is determined by the same method for determining the temperature T1 except that the applied pressure is changed from 1 MPa to 4 MPa. The temperature difference (T1−T2) is calculated from the temperature T1 and the temperature T2. The temperature difference (T1−T3) is calculated from the temperature T1 and the temperature T3.

Other Properties

Here, the pressure-responsive particles may be transparent.

When the transparent pressure-responsive particles are applied onto an image portion of a recording medium, the transparency of the pressure-responsive particles ensures that the image portion remain visible.

Here, "transparent" means that, in a region where the pressure-responsive particles are fixed, the average transmittance in a visible light range (400 nm or more and 700 nm or less) is 10% or more, preferably 50% or more, more preferably 80% or more, and yet more preferably 90% or more.

The average transmittance is measured by using a spectrophotometer V700 (produced by JASCO Corporation).

Method for Producing Pressure-Responsive Particles

The pressure-responsive particles are obtained by first producing base particles B and then externally adding an external additive to the base particles B.

The base particles B may be produced by a dry method (for example, a kneading and pulverizing method) or a wet method (for example, an aggregation and coalescence method, a suspension polymerization method, or a dissolution and suspension method). The method for producing the base particles B may be any, and any known method may be employed. In particular, the base particles B may be obtained by an aggregation and coalescence method.

The base particles B are produced by an aggregation and coalescence method that involves, for example,

- a step of preparing a styrene resin particle dispersion in which styrene resin particles containing a styrene resin are dispersed (styrene resin particle dispersion preparation step),
- a step of forming composite resin particles that contain a styrene resin and a (meth)acrylate resin by polymerizing a (meth)acrylate resin in the styrene resin particle dispersion (composite resin particle forming step), a step of forming aggregated particles by aggregating the composite resin particles in a composite resin particle dispersion in which the composite resin particles are dispersed (aggregated particle forming step), and a step of forming base particles B by heating the aggregated particle dispersion in which the aggregated particles are dispersed, and fusing and coalescing the aggregated particles (fusing and coalescing step).

These steps will now be described in detail.

In the description below, a method for obtaining base particles B not containing a coloring agent or a releasing agent is described. A coloring agent, a releasing agent, and other additives may be used as needed. When the base particles B are to contain a coloring agent and a releasing agent, after mixing the composite resin particle dispersion, a coloring agent particle dispersion, and a releasing agent particle dispersion, the fusing and coalescing step is performed. The coloring agent particle dispersion and the releasing agent particle dispersion are prepared by, for example, mixing raw materials and then dispersing the resulting mixture in a known disperser machine.

Styrene Resin Particle Dispersion Preparation Step

The styrene resin particle dispersion is, for example, prepared by dispersing styrene resin particles in a dispersion medium by using a surfactant.

Examples of the dispersion medium include aqueous media such as water and alcohols. These may be used alone or in combination.

Examples of the surfactant include anionic surfactants such as sulfate esters, sulfonates, phosphate esters, and soaps; cationic surfactants such as amine salts and quaternary ammonium salts; and nonionic surfactants such as polyethylene glycol, alkyl phenol-ethylene oxide adducts, and polyhydric alcohols. A nonionic surfactant may be used in combination with an anionic surfactant or a cationic surfactant. Among these, an anionic surfactant may be used. These surfactants may be used alone or in combination.

Examples of the method for dispersing the styrene resin particles in a dispersion medium include methods that involve mixing a styrene resin and a dispersion medium and then dispersing the resin by stirring in a rotational shear-type homogenizer, or a mill that uses media such as a ball mill, a sand mill, or a dyno mill.

Another example of the method for dispersing styrene resin particles in a dispersion medium is an emulsion polymerization method. Specifically, after polymerization components of a styrene resin, and a chain transfer agent or a polymerization initiator are mixed, an aqueous medium containing a surfactant is added to the resulting mixture, the resulting mixture is stirred to prepare an emulsion, and the styrene resin is polymerized in the emulsion. Here, the chain transfer agent may be dodecanethiol.

The volume average particle diameter of the styrene resin particles dispersed in the styrene resin particle dispersion is preferably 100 nm or more and 250 nm or less, more preferably 120 nm or more and 220 nm or less, and yet more preferably 150 nm or more and 200 nm or less.

The volume average particle diameter of resin particles contained in a resin particle dispersion is determined by measuring the particle diameter with a laser diffraction particle size distribution meter (for example, LA-700 produced by Horiba Ltd.) and determining the particle diameter at 50% accumulation in a volume-based particle size distribution calculated from the small diameter side. The result is assumed to be the volume average particle diameter (D50v).

The styrene resin particle content in the styrene resin particle dispersion is preferably 30 mass % or more and 60 mass % or less and is more preferably 40 mass % or more and 50 mass % or less.

Composite Resin Particle Forming Step

The styrene resin particle dispersion and polymerization components of the (meth)acrylate resin are mixed, and the (meth)acrylate resin is polymerized in the styrene resin particle dispersion to form composite resin particles that contain the styrene resin and the (meth)acrylate resin.

The composite resin particles may be resin particles containing a styrene resin and a (meth)acrylate resin that are in a microphase-separated state. Such resin particles are produced by, for example, the following method.

To a styrene resin particle dispersion, polymerization components (a monomer group containing at least two (meth)acrylates) of the (meth)acrylate resin are added, and, if needed, an aqueous medium is added thereto. Next, while slowly stirring the dispersion, the temperature of the dispersion is elevated to a temperature higher than or equal to the glass transition temperature of the styrene resin (for example, a temperature 10° C. to 30° C. higher than the glass transition temperature of the styrene resin). Next, while maintaining the temperature, an aqueous medium containing a polymerization initiator is slowly added dropwise, and then stirring is continued for a long time within the range of 1 to 15 hours. Here, ammonium persulfate may be used as the polymerization initiator.

The detailed mechanism is not clear; however, it is presumed that when the aforementioned method is employed, the monomers and the polymerization initiator penetrate into the styrene resin particles, and polymerization of the (meth)acrylate occurs inside the styrene resin particles. It is presumed that because of this mechanism, composite resin particles in which the (meth)acrylate resin is contained inside the styrene resin particles and in which the styrene resin and the (meth)acrylate resin are in a microphase-separated state inside the particles are obtained.

The volume average particle diameter of the composite resin particles dispersed in the composite resin particle dispersion the pressure sensitive adhesive, the same applies hereinafter) is preferably 140 nm or more and 300 nm or less, more preferably 150 nm or more and 280 nm or less, and yet more preferably 160 nm or more and 250 nm or less.

The composite resin particle content in the composite resin particle dispersion is preferably 20 mass % or more and 50 mass % or less and is more preferably 30 mass % or more and 40 mass % or less.

Aggregated Particle Forming Step

The composite resin particles are aggregated in the composite resin particle dispersion so as to form aggregated particles having diameters close to the target diameter of the base particles B.

Specifically, for example, after adding an aggregating agent to the composite resin particle dispersion, adjusting the pH of the composite resin particle dispersion to acidic (for example, a pH of 2 or more and 5 or less), and adding a dispersion stabilizer as needed, the resulting mixture is heated to a temperature close to the glass transition temperature of the styrene resin (specifically, for example, a temperature 10° C. to 30° C. lower than the glass transition temperature of the styrene resin) so as to aggregate the composite resin particles and form aggregated particles.

In the aggregated particle forming step, heating may be performed after adding an aggregating agent to the composite resin particle dispersion while stirring the composite resin particle dispersion with a rotational shear-type homogenizer at room temperature (for example, 25° C.), adjusting the pH of the composite resin particle dispersion to acidic (for example, a pH of 2 or more and 5 or less), and adding a dispersion stabilizer as needed.

Examples of the aggregating agent include a surfactant having an opposite polarity to the surfactant contained in the composite resin particle dispersion, an inorganic metal salt, and a divalent or higher valent metal complex. When a metal complex is used as the aggregating agent, the amount of the surfactant used is reduced, and the charge properties are improved.

An additive that forms a complex with a metal ion in the aggregating agent or that forms a similar bond therewith may be used in combination with the aggregating agent as needed. An example of such an additive is a chelating agent.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less and more preferably 0.1 parts by mass or more and less than 3.0 parts by mass relative to 100 parts by mass of the resin particles.

Fusing and Coalescing Step

Next, the aggregated particle dispersion in which the aggregated particles are dispersed is heated to, for example, a temperature equal to or higher than the glass transition temperature of the styrene resin (for example, a temperature 10° C. to 30° C. higher than the glass transition temperature of the styrene resin) to fuse and coalesce the aggregated particles and form base particles B.

Base Particles B Having a Core-Shell Structure are Produced Through the Following Steps, for Example:

- a step of forming second aggregated particles by further mixing the obtained aggregated particle dispersion with a styrene resin particle dispersion and performing aggregation such that styrene resin particles additionally adhere to the surfaces of the aggregated particles; and
- a step of forming base particles B having a core-shell structure by heating the second aggregated particle dispersion in which the second aggregated particles are dispersed, and fusing and coalescing the second aggregated particles.

The base particles B having a core-shell structure obtained through the aforementioned steps have a shell layer that contains a styrene resin. Instead of the styrene resin particle dispersion, a resin particle dispersion in which a different type of resin particles are dispersed may be used to form a shell layer that contains the different type of resin.

After completion of the fusing and coalescing step, the base particles B formed in the solution are subjected to a washing step, a solid-liquid separation step, and a drying step known in the art so as to obtain dry base particles B. From the viewpoint of chargeability, the washing step may involve thorough displacement washing using ion exchange water. From the viewpoint of productivity, the solid-liquid separation step may involve suction filtration, pressure filtration, or the like. From the viewpoint of productivity, the drying step may involve freeze-drying, flash-drying, fluid-drying, vibration-type fluid-drying, or the like.

The pressure-responsive particles are produced, for example, by adding an external additive to the obtained dry base particles B and mixing the resulting mixture. Mixing may be performed by using a V blender, a HENSCHEL mixer, a Lodige mixer, or the like. Furthermore, if needed, a vibrating screen, an air screen, or the like may be used to remove coarse particles from the pressure-responsive particles.

Relationship Between Toner Particles A and Base Particles B Volume Average Particle Diameter When the volume average particle diameter of the toner particles A is represented by D50A and the volume average particle diameter of the base particles B is represented by D50B, the D50A and the D50B satisfy formula 1-1 below:

$$1.5\ \mu m<(D50B-D50A)$$

From the viewpoint of forming a particle set for producing a printed matter having better adhesiveness, D50A and D50B preferably satisfy formula 1-2 below, more preferably satisfy formula 1-3 below, and still more preferably satisfy formula 1-4 below:

$$1.5\ \mu m<(D50B-D50A)<15\ \mu m \qquad \text{Formula 1-2:}$$

$$1.5\ \mu m<(D50B-D50A)<10\ \mu m \qquad \text{Formula 1-3:}$$

$$1.5\ \mu m<(D50B-D50A)<7.0\ \mu m \qquad \text{Formula 1-4:}$$

From the viewpoint of further increasing the pressure applied to the layer formed of pressure-responsive particles during pressure bonding by increasing the difference in thickness between the layer formed of the pressure-responsive particles and the layer (image) formed of the chromatic color toner, D50B is preferably 6.0 μm or more and 20.0 μm or less, more preferably 7.0 μm or more and 15.0 μm or less, and yet more preferably 8.0 μm or more and 13.0 μm or less.

Various average particle diameters of the toner particles A and the base particles B and various particle size distribution indices are measured by using COULTER MULTISIZER II (produced by Beckman Coulter Inc.) and ISOTON-II (produced by Beckman Coulter Inc.) as the electrolyte.

In measuring, a 0.5 mg or more and 50 mg or less of a measurement sample is added to 2 mL of a 5% aqueous solution of a surfactant (sodium alkylbenzene sulfonate) serving as a dispersing agent. The resulting mixture is added to 100 mL or more and 150 mL or less of the electrolyte.

The electrolyte in which the sample is suspended is dispersed for 1 minute by using an ultrasonic disperser, and the particle size distribution of particles having a particle diameter in the range of 2 μm or more and 60 μm or less is measured by using Coulter MULTISIZER II with an aperture having a diameter of 100 μm. The number of sampled particles is 50,000.

On the basis of the measured particle size distribution, the volume and the number are plotted versus particle size ranges (channels) from the small diameter side to draw cumulative distributions. The particle diameters at 16% accumulation are defined as a volume particle diameter D16v and a number particle diameter D16p, the particle diameters at 50% accumulation are defined as a volume average particle diameter D50v and accumulated number average particle diameter D50p, and the particle diameters at 84% accumulation are defined as a volume particle diameter D84v and a number particle diameter D84p.

These are used to calculate the volume particle size distribution index (GSDv) from $(D84v/D16v)^{1/2}$, and a number particle size distribution index (GSDp) from $(D84p/D16p)^{1/2}$.

The toner particles A and the base particles B preferably have an average circularity of 0.94 or more and 1.00 or less and more preferably 0.95 or more and 0.98 or less.

The average circularity of the toner particles A and the base particles B is determined from (circle-equivalent perimeter)/(perimeter) [(perimeter of a circle having the same projection area as the particle image)/(perimeter of a particle projection image)]. Specifically, it is the value measured by the following method.

First, toner particles to be measured are sampled by suction, and are allowed to form a flat flow. Particle images are captured as still images by performing instantaneous strobe light emission, and these particle images are analyzed by a flow-type particle image analyzer (FPIA-3000 produced by Sysmex Corporation) to determine the average circularity. In determining the average circularity, 3500 particles are sampled.

When a toner contains an external additive, the toner (developer) to be measured is dispersed in a surfactant-containing water, and then ultrasonically treated to obtain toner particles from which the external additive have been removed.

Releasing Agent Content

The toner particles A and the base particles B may both contain a releasing agent, and the ratio ($W_B/W_A$) of the releasing agent content $W_B$ in the base particles B to the releasing agent content $W_A$ in the toner particles A is preferably 0.01 or more and 0.8 or less, more preferably 0.05 or more and 0.7 or less, and yet more preferably 0.1 or more and 0.6 or less.

The content $W_A$ is the "content of the releasing agent contained in the toner particles A relative to the entirety of the toner particles A".

The content $W_B$ is the "content of the releasing agent contained in the base particles B relative to the entirety of the base particles B".

When both the toner particles A and the base particles B contain a releasing agent and when the releasing contents are within the aforementioned numerical range, a particle set for producing a printed matter having better adhesiveness is obtained. The reasons for this are presumably as follows.

When the releasing agent content ratio ($W_B/W_A$) is 0.01 or more, the amount of the releasing agent in the pressure-responsive particles is large, and this prevents offset during thermal fixing. Suppression of offset suppresses the decrease in the amount of the pressure-responsive particles and, as a result, improves adhesive force. When the releasing agent content ratio ($W_B/W_A$) is 0.8 or less, the amount of the releasing agent is not excessively large relative to the amount of the resins in the pressure-responsive particles, and thus the amount of the releasing agent present on the image surface during thermal fixing is not excessively large. As a result, the phenomenon in which the adhesiveness is degraded by penetration of the releasing agent into the gaps between the pressure-responsive particles that exhibit the adhesive force is suppressed.

From the viewpoint of forming a particle set for producing a printed matter having better adhesiveness, the releasing agent content $W_B$ is preferably 0.1 mass % or more and 4.0 mass % or less, more preferably 0.2 mass % or more and 3.0 mass % or less, and yet more preferably 0.5 mass % or more and 2.5 mass % or less.

The content $W_A$ and the content $W_B$ are determined by using a differential scanning calorimeter (DSC60 produced by Shimadzu Corporation, equipped with an automatic tangent processing system) by an ASTM method from the endothermic energy amount in the melting temperature region while assuming the endothermic energy amount of the same weight of the releasing agent as 100.

When particles to be measured contain an external additive, measurement is conducted after the particles to be measured are dispersed in a surfactant-containing water and ultrasonically treated to remove the external additive.

Developer Set

In the description below, a developer set according to an exemplary embodiment is described.

One example in which the pressure-responsive particles of the exemplary embodiment are used as a toner is described in the description of the developer set.

In the description of the developer set, the "particle set for producing a printed matter" is referred to as a "toner set", and the "pressure-responsive particles" are referred to as a "transparent toner".

A developer set according to an exemplary embodiment contains a developer (hereinafter may also be referred to as an electrostatic charge image developer) that contains at least a chromatic color toner, and a developer that contains at least a transparent toner.

Here, the chromatic color toner of the exemplary embodiment is employed as the chromatic color toner.

Furthermore, the pressure-responsive particles of the exemplary embodiment are employed as the transparent toner.

The electrostatic charge image developer that constitutes the developer set of this exemplary embodiment may be a one-component developer that contains the toner only, or a two-component developer that contains the toner and a carrier. When both the electrostatic charge image developer that contains a chromatic color toner and the electrostatic charge image developer that contains a transparent toner are two-component developers, the type and content of the carrier contained in these developers may be the same or different.

The carrier may be any known carrier. Examples of the carrier include a coated carrier obtained by covering a surface of a core formed of a magnetic powder with a coating resin; a magnetic powder-dispersed carrier in which a magnetic powder is dispersed and blended in a matrix resin; and a resin-impregnated carrier in which a porous magnetic powder is impregnated with a resin. The magnetic powder-dispersed carrier and the resin-impregnated carrier may each be constituted by a core having a surface coated with a resin.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, an organosiloxane bond-containing straight silicone resin and modified products thereof, a fluororesin, polyester, polycarbonate, phenolic resin, and epoxy resin. The coating resin and the matrix resin may each contain other additives such as conductive particles. Examples of the conductive particles include particles of metals such as gold, silver, and copper, and particles of carbon black, titanium oxide, zinc oxide, tin oxide, barium sulfate, aluminum borate, and potassium titanate.

An example of the method for coating the surface of the core with a resin include a method that involves coating the surface of the core with a coating layer-forming solution prepared by dissolving a coating resin and various additives (used as needed) in an appropriate solvent. The solvent is not particularly limited, and may be selected in view of the type of the resin used, application suitability, etc.

Specific examples of the resin coating method include a dipping method that involves dipping a core in a coating layer-forming solution, a spraying method that involves spraying a coating layer-forming solution onto the surface of the core, a flow bed method that involves spraying a coating layer-forming solution while the core floats on flowing air, and a kneader coater method that involves mixing the core for the carrier and a coating layer-forming solution in a kneader coater and then removing the solvent.

The toner-to-carrier mixing ratio (mass ratio) in the two-component developer is preferably 1:100 to 30:100, and more preferably 3:100 to 20:100.

Apparatus for Producing Printed Matter and Method for Producing Printed Matter

An apparatus for producing a printed matter according to an exemplary embodiment includes a chromatic color toner image forming unit that stores a developer that contains the chromatic color toner in the particle set for producing a printed matter of the exemplary embodiment, and that electrophotographically forms a chromatic color toner image on a recording medium by using the developer;

- an applying unit that stores the pressure-responsive particles in the particle set for producing a printed matter of the exemplary embodiment and that applies the pressure-responsive particles to a recording medium to form a pressure-responsive particle layer;
- a thermal fixing unit that is equipped with a fixing member and that thermally fixes the chromatic color toner image onto the recording medium while the fixing member is in contact with the pressure-responsive particle layer; and
- a pressure bonding unit that folds the recording medium on which the chromatic color toner image has been thermally fixed and pressure-bonds the folded recording medium, or that stacks another recording medium on top of the recording medium on which the chromatic color toner image has been formed and pressure-bonds the stacked recording media.

The apparatus for producing a printed matter according to an exemplary embodiment is used to implement the method for producing a printed matter of an exemplary embodiment.

A method for producing a printed matter according to an exemplary embodiment includes a chromatic color toner image forming step of electrophotographically forming a chromatic color toner image on a recording medium by using a developer that contains a chromatic color toner in the particle set for producing a printed matter of the exemplary embodiment;

- an applying step of forming a pressure-responsive particle layer by applying, to the recording medium, the pressure-responsive particles in the particle set for producing a printed matter of the exemplary embodiment;
- a thermal fixing step of thermally fixing the chromatic color toner image onto the recording medium while a fixing member is in contact with the pressure-responsive particle layer; and
- a pressure bonding step of folding the recording medium on which the chromatic color toner image has been thermally fixed and pressure-bonding the folded recording medium, or stacking another recording medium on top of the recording medium on which the chromatic color toner image has been formed and pressure-bonding the stacked recording media.

The chromatic color toner image forming unit included in the apparatus for producing a printed matter according to the exemplary embodiment includes, for example:

- a photoreceptor;
- a charging unit that charges a surface of the photoreceptor;
- an electrostatic charge image forming unit that forms an electrostatic charge image on the charged surface of the photoreceptor;
- a developing unit that stores an electrostatic charge image developer that contains the chromatic color toner in the particle set for producing a printed matter of the exemplary embodiment, and develops the electrostatic charge image on the surface of the photoreceptor into a chromatic color toner image by using the electrostatic charge image developer; and
- a transfer unit that transfers the toner image on the surface of the photoreceptor onto a surface of a recording medium.

The applying unit included in the apparatus for producing a printed matter according to the exemplary embodiment includes, for example:

- a photoreceptor;
- a charging unit that charges a surface of the photoreceptor;
- an electrostatic charge image forming unit that forms an electrostatic charge image on the charged surface of the photoreceptor;
- a developing unit that stores an electrostatic charge image developer that contains, as a toner, the pressure-responsive particles in the particle set for producing a printed matter of the exemplary embodiment, and develops the electrostatic charge image on the surface of the photoreceptor into a pressure-responsive particle layer by using the electrostatic charge image developer; and
- a transfer unit that transfers the pressure-responsive particle layer on the surface of the photoreceptor onto a surface of a recording medium.

The method employed by the applying unit included in the apparatus for producing a printed matter according to the exemplary embodiment is not limited to the aforementioned electrophotographic method, and other methods, such as a spraying method, a bar coating method, a die coating method, a knife coating method, a roll coating method, a reverse roll coating method, a gravure coating method, a screen printing method, an inkjet method, and a laminating method, may be employed.

The chromatic color toner image forming step included in the method for producing a printed matter according to the exemplary embodiment includes, for example:

- a charging step of charging a surface of the photoreceptor;
- an electrostatic charge image forming step of forming an electrostatic charge image on the charged surface of the photoreceptor;
- a developing step of developing the electrostatic charge image on the surface of the photoreceptor into a chromatic color toner image by using the electrostatic charge image developer that contains the chromatic color toner in the particle set for producing a printed matter of the exemplary embodiment; and a transfer step of transferring the chromatic color toner image on the surface of the photoreceptor onto a surface of a recording medium.

The applying step included in the method for producing a printed matter according to the exemplary embodiment includes, for example:

a charging step of charging a surface of the photoreceptor;

an electrostatic charge image forming step of forming an electrostatic charge image on the charged surface of the photoreceptor;

a developing step of developing the electrostatic charge image on the surface of the photoreceptor into a pressure-responsive particle layer by using the electrostatic charge image developer that contains, as a toner, the pressure-responsive particles in the particle set for producing a printed matter of the exemplary embodiment; and a transfer step of transferring the pressure-responsive particle layer on the surface of the photoreceptor onto a surface of a recording medium.

The method employed by the applying step included in the method for producing a printed matter according to the exemplary embodiment is not limited to the aforementioned electrophotographic method, and other methods, such as a spraying method, a bar coating method, a die coating method, a knife coating method, a roll coating method, a reverse roll coating method, a gravure coating method, a screen printing method, an inkjet method, and a laminating method, may be employed.

The chromatic color toner image forming unit is, for example, a direct transfer type apparatus with which a chromatic color toner image formed on a surface of a photoreceptor is directly transferred onto a recording medium; an intermediate transfer type apparatus with which a chromatic color toner image formed on a surface of a photoreceptor is first transferred onto a surface of an intermediate transfer body and then the chromatic color toner image on the intermediate transfer body is transferred for the second time onto a surface of a recording medium; an apparatus equipped with a cleaning unit that cleans the surface of a photoreceptor after the transfer of the chromatic color toner image and before charging; or an apparatus equipped with a charge erasing unit that irradiates the surface of a photoreceptor with charge erasing light to remove charges after the transfer of the chromatic color toner image and before charging. When the chromatic color toner image forming unit is an intermediate transfer type apparatus, the transfer unit includes, for example, an intermediate transfer body that has a surface onto which the chromatic color toner image is transferred, a first transfer unit that first transfers the chromatic color toner image on the surface of the photoreceptor onto the surface of the intermediate transfer body, and a second transfer unit that second transfers the chromatic color toner image on the surface of the intermediate transfer body onto a surface of a recording medium.

When the electrophotographic method is employed, the applying unit is, for example, a direct transfer type apparatus with which the pressure-responsive particle layer on the surface of the photoreceptor is directly transferred onto a recording medium having a chromatic color toner image thereon; an intermediate transfer type apparatus with which the pressure-responsive particle layer on the surface of the photoreceptor is first transferred onto a surface of an intermediate transfer body and then the pressure-responsive particle layer on the intermediate transfer body is transferred for the second time onto a surface of a recording medium; an apparatus equipped with a cleaning unit that cleans the surface of a photoreceptor after the transfer of the pressure-responsive particle layer and before charging; or an apparatus equipped with a charge erasing unit that irradiates the surface of a photoreceptor with charge erasing light to remove charges after the transfer of the pressure-responsive particle layer and before charging. When the applying unit is an intermediate transfer type apparatus, the transfer unit includes, for example, an intermediate transfer body that has a surface onto which the pressure-responsive particle layer is transferred, a first transfer unit that first transfers the pressure-responsive particle layer on the surface of the photoreceptor onto the surface of the intermediate transfer body, and a second transfer unit that second transfers the pressure-responsive particle layer on the surface of the intermediate transfer body onto a surface of the recording medium.

In the chromatic color toner image forming unit and the applying unit, a portion that includes the developing unit may have a cartridge structure (in other words, a process cartridge) that is detachably attachable to the chromatic color toner image forming unit and the applying unit. An example of the process cartridge is a process cartridge that stores the electrostatic charge image developer in the developer set of the exemplary embodiment and is equipped with a developing unit. The process cartridge may be designed as a cartridge set constituted by: a first process cartridge equipped with a first developing unit that stores an electrostatic charge image developer containing a chromatic color toner; and a second process cartridge equipped with a second developing unit that stores an electrostatic charge image developer containing, as a toner, pressure-responsive particles.

The pressure bonding unit included in the apparatus for producing a printed matter according to the exemplary embodiment applies pressure to the recording medium to which the pressure-responsive particles from the particle set for producing a printed matter of the exemplary embodiment are applied. As a result, the pressure-responsive particles fluidize on the recording medium and exhibit adhesiveness. The pressure applied by the pressure bonding unit to the recording medium to fluidize the pressure-responsive particles is preferably 3 MPa or more and 300 MPa or less, more preferably 10 MPa or more and 200 MPa or less, and yet more preferably 30 MPa or more and 150 MPa or less.

The pressure-responsive particles in the particle set for producing a printed matter of the exemplary embodiment may be applied to the entire surface of the recording medium or only a portion of the recording medium. The pressure-responsive particles in the particle set for producing a printed matter of the exemplary embodiment are applied to the recording medium to form one layer or multiple layers. The pressure-responsive particle layer formed of the pressure-responsive particles in the particle set for producing a printed matter of the exemplary embodiment may be a layer that is continuous or discontinuous in the surface direction of the recording medium.

The amount of the pressure-responsive particles on the recording medium in the applied region is, for example, 0.5 $g/m^2$ or more and 50 $g/m^2$ or less, 1 $g/m^2$ or more and 40 $g/m^2$ or less, or 1.5 $g/m^2$ or more and 30 $g/m^2$ or less. The thickness of the layer of the pressure-responsive particles on the recording medium is, for example, 0.2 μm or more and 25 μm or less, 0.4 μm or more and 20 μm or less, or 0.6 μm or more and 15 μm or less.

Examples of the recording medium used in the apparatus for producing a printed matter according to the exemplary embodiment include paper, coated paper having resin-coated surfaces, cloth, non-woven cloth, resin films, and resin sheets. The recording medium may have an image on one surface or both surfaces.

Hereinafter, one example of the apparatus for producing a printed matter according to the exemplary embodiment is described, but the exemplary embodiment is not limited to this example.

In the description of one example of the apparatus for producing a printed matter, the "particle set for producing a printed matter" is referred to as a "toner set", and the "pressure-responsive particles" are referred to as a "transparent toner".

FIG. 1 is a schematic diagram illustrating one part that includes an applying unit and a pressure bonding unit of one example of the apparatus for producing a printed matter of the exemplary embodiment. The apparatus for producing a printed matter illustrated in FIG. 1 is equipped with an applying unit 100 and a pressure bonding unit 200 downstream of the applying unit 100. The arrow indicates the rotation direction of the photoreceptor or the conveying direction of the recording medium.

The applying unit 100 is a direct transfer-type apparatus with which the transparent toner is electrophotographically applied to a recording medium P, which has a chromatic color toner image formed thereon, by using a developer that contains the transparent toner in the toner set of the exemplary embodiment. The recording medium P has a chromatic color toner image formed on one surface or both surfaces in advance.

The applying unit 100 includes a photoreceptor 101. The photoreceptor 101 are surrounded by, in order of arrangement, a charging roll (one example of the charging unit) 102 that charges a surface of the photoreceptor 101, an exposing device (one example of the electrostatic charge image forming unit) 103 that exposes the charged surface of the photoreceptor 101 with a laser beam to form an electrostatic charge image, a developing device (one example of the developing unit) 104 that develops the electrostatic charge image by supplying a toner to the electrostatic charge image, a transfer roll (one example of the transfer unit) 105 that transfers the developed toner image onto a recording medium P, and a photoreceptor cleaning device (one example of the cleaning unit) 106 that removes the toner remaining on the surface of the photoreceptor 101 after transfer.

The operation of the applying unit 100 of applying the transparent toner to the recording medium P is described.

First, the surface of the photoreceptor 101 is charged by the charging roll 102. The charged surface of the photoreceptor 101 is irradiated with a laser beam emitted from the exposing device 103 on the basis of the image data transmitted from a controller (not illustrated in the drawings). As a result, an electrostatic charge image of the application pattern of the transparent toner is formed on the surface of the photoreceptor 101.

The electrostatic charge image formed on the photoreceptor 101 is rotated to a developing position as the photoreceptor 101 is run. At that developing position, the electrostatic charge image on the photoreceptor 101 is developed by the developing device 104 into a transparent toner layer.

The developing device 104 stores a developer that contains at least a transparent toner and a carrier. The transparent toner is frictionally charged by being stirred with the carrier in the developing device 104, and is held on the developer roll. As the surface of the photoreceptor 101 passes the developing device 104, the transparent toner electrostatically adheres to the electrostatic charge image on the surface of the photoreceptor 101, and the electrostatic charge image is developed with the transparent toner. The photoreceptor 101 on which the transparent toner layer is formed by the transparent toner is continuously run, and the developed transparent toner layer on the photoreceptor 101 is conveyed to a transfer position.

Once the transparent toner layer on the photoreceptor 101 is conveyed to the transfer position, a transfer bias is applied to the transfer roll 105, an electrostatic force acting from the photoreceptor 101 toward the transfer roll 105 acts on the transparent toner layer, and the transparent toner layer on the photoreceptor 101 is transferred onto the recording medium P.

The transparent toner remaining on the photoreceptor 101 is removed by the photoreceptor cleaning device 106 and recovered. The photoreceptor cleaning device 106 is, for example, a cleaning blade or a cleaning brush. The photoreceptor cleaning device 106 may be a cleaning brush from the viewpoint of suppressing the phenomenon in which the transparent toner remaining on the surface of the photoreceptor undergoes fluidization under pressure and forms a film adhering to the surface of the photoreceptor.

The recording medium P onto which the transparent toner layer has been transferred is conveyed to the fixing device (one example of the fixing unit) 107. The fixing device 107 is, for example, a pair of fixing members (roll/roll or belt/roll). The pressure that the fixing device 107 applies to the recording medium P may be lower than the pressure that the pressurizing device 230 applies to the recording medium P, and may specifically be 0.2 MPa or more and 1 MPa or less.

The fixing device 107 may have a heating source (for example, a halogen heater) inside for heating the recording medium P, but this is optional. When the fixing device 107 has a heating source inside, the surface temperature of the recording medium P heated by the heating source is preferably 150° C. or higher and 220° C. or lower, more preferably 155° C. or higher and 210° C. or lower, and yet more preferably 160° C. or higher and 200° C. or lower. Even when the fixing device 107 does not have a heating source inside, the temperature inside the fixing device 107 may rise to a temperature higher than the ambient temperature due to the heat generated from a motor in the applying unit 100 or the like.

As the recording medium P passes the applying unit 100, the recording medium P turns into a recording medium P1 on which a transparent toner is applied onto the image. The recording medium P1 is then conveyed toward the pressure bonding unit 200.

In the apparatus for producing a printed matter of this exemplary embodiment, the applying unit 100 and the pressure bonding unit 200 may be close to each other or remote from each other. When the applying unit 100 and the pressure bonding unit 200 are remote from each other, the applying unit 100 and the pressure bonding unit 200 are, for example, linked through a conveying unit (for example, a belt conveyor) that conveys the recording medium P1.

The pressure bonding unit 200 is equipped with a folding device 220 and a pressurizing device 230, and folds the recording medium P1 and pressure-bonds the folded recording medium P1.

The folding device 220 folds the recording medium P1 passing therethrough to form a folded recording medium P2. The recording medium P2 may be folded in two, in three, or in four, for example, and only a portion of the recording medium P2 may be folded. The recording medium P2 is in such a state that the transparent toner is applied to at least part of at least one surface of the two surfaces of the opposing flaps.

The folding device 220 may have a pair of pressurizing members (for example, roll/roll or belt/roll) that applies pressure to the recording medium P2. The pressure that the folding device 220 applies to the recording medium P2 may be lower than the pressure that the pressurizing device 230 applies to the recording medium P2, and may specifically be 1 MPa or more and 10 MPa or less.

The pressure bonding unit 200 may be equipped with, instead of the folding device 220, a stacking device that stacks the recording medium P1 and another recording medium on top of each other. The arrangement in which the recording medium P1 and another recording medium are stacked on top of each other may be, for example, the arrangement in which one recording medium is stacked on the recording medium P1, and the arrangement in which one recording medium is stacked on each of multiple portions on the recording medium P1. This another recording medium may have an image formed on one surface or both surfaces in advance, may have no image formed thereon, or may be a pressure-bonded printed matter prepared in advance.

The recording medium P2 exits the folding device 220 (or stacking device) and is then conveyed toward the pressurizing device 230.

The pressurizing device 230 is equipped with a pair of pressurizing members (in other words, pressurizing rolls 231 and 232). The pressurizing roll 231 and the pressurizing roll 232 contact and push each other at their outer peripheral surfaces to apply a pressure onto the recording medium P2 passing therebetween. The pair of pressurizing members in the pressurizing device 230 is not limited to the combination of pressurizing rolls, and may be a combination of a pressurizing roll and a pressurizing belt or a combination of a pressurizing belt and a pressurizing belt.

When pressure is applied to the recording medium P2 passing the pressurizing device 230, the transparent toner on the recording medium P2 is fluidized under pressure and exhibits adhesiveness. The pressure that the pressurizing device 230 applies to the recording medium P2 is preferably 3 MPa or more and 300 MPa or less, more preferably 10 MPa or more and 200 MPa or less, and yet more preferably 30 MPa or more and 150 MPa or less.

The pressurizing device 230 may have a heating source (for example, a halogen heater) inside for heating the recording medium P2, but this is optional. When the pressurizing device 230 has a heating source inside, the surface temperature of the recording medium P2 heated by the heating source is preferably 30° C. or higher and 120° C. or lower, more preferably 40° C. or higher and 100° C. or lower, and yet more preferably 50° C. or higher and 90° C. or lower. Even when the pressurizing device 230 does not have a heating source inside, the temperature inside the pressurizing device 230 may rise to a temperature higher than the ambient temperature due to the heat generated from a motor in the pressurizing device 230 or the like.

As the recording medium P2 passes the pressurizing device 230, the overlapping surfaces become bonded with the fluidized transparent toner, and a pressure-bonded printed matter P3 is obtained. The pressure-bonded printed matter P3 have opposing surfaces partly or entirely bonded to each other.

The finished pressure-bonded printed matter P3 is discharged from the pressurizing device 230.

A first form of the pressure-bonded printed matter P3 is obtained by bonding opposing surfaces of a folded recording medium by using a transparent toner. The pressure-bonded printed matter P3 of this form is produced by a printed matter producing apparatus equipped with a folding device 220.

A second form of the pressure-bonded printed matter P3 is obtained by bonding opposing surfaces of multiple recording media stacked on top of each other by using a transparent toner. The pressure-bonded printed matter P3 of this form is produced by a printed matter producing apparatus equipped with a stacking device.

The apparatus for producing a printed matter according to this exemplary embodiment is not limited to a type of apparatus that continuously conveys the recording medium P2 from the folding device 220 (or stacking device) to the pressurizing device 230. The apparatus for producing a printed matter according to this exemplary embodiment may be of a type that stocks the recording media P2 discharged from the folding device 220 (or stacking device) and that conveys the recording medium P2 to the pressurizing device 230 after the amount of the recording media P2 stocked has reached a predetermined level.

In the apparatus for producing a printed matter of this exemplary embodiment, the folding device 220 (or stacking device) and the pressurizing device 230 may be close to each other or remote from each other. When the folding device 220 (or stacking device) and the pressurizing device 230 are remote from each other, the folding device 220 and the pressurizing device 230 are, for example, linked through a conveying unit (for example, a belt conveyor) that conveys the recording medium P2.

An apparatus for producing a printed matter according to the exemplary embodiment may be equipped with a cutting unit that cuts a recording medium into a predetermined size. Examples of the cutting unit include a cutting unit that is disposed between the applying unit 100 and the pressure bonding unit 200 and cuts off a part of the recording medium P1, the part being a region where no transparent toner is disposed; a cutting unit that is disposed between the folding device 220 and the pressurizing device 230 and cuts off a part of the recording medium P2, the part being a region where no transparent toner is disposed; and a cutting unit that is disposed downstream of the pressure bonding unit 200 and cuts off a part of the pressure-bonded printed matter P3, the part being a region not bonded with the transparent toner.

The apparatus for producing a printed matter according to the exemplary embodiment is not limited to a single sheet-type apparatus. The apparatus for producing a printed matter according to this exemplary embodiment may be of a type that performs an applying step and the pressure bonding step on a long recording medium to form a long pressure bonded printed matter, and then cuts the long pressure bonded printed matter into a predetermined size.

Hereinafter, another example of the apparatus for producing a printed matter according to an exemplary embodiment equipped with a chromatic color toner image forming unit is described, but the exemplary embodiment is not limited to this example. In the description below, only the relevant parts in the drawing are described, and descriptions for other parts are omitted.

Figure 2:
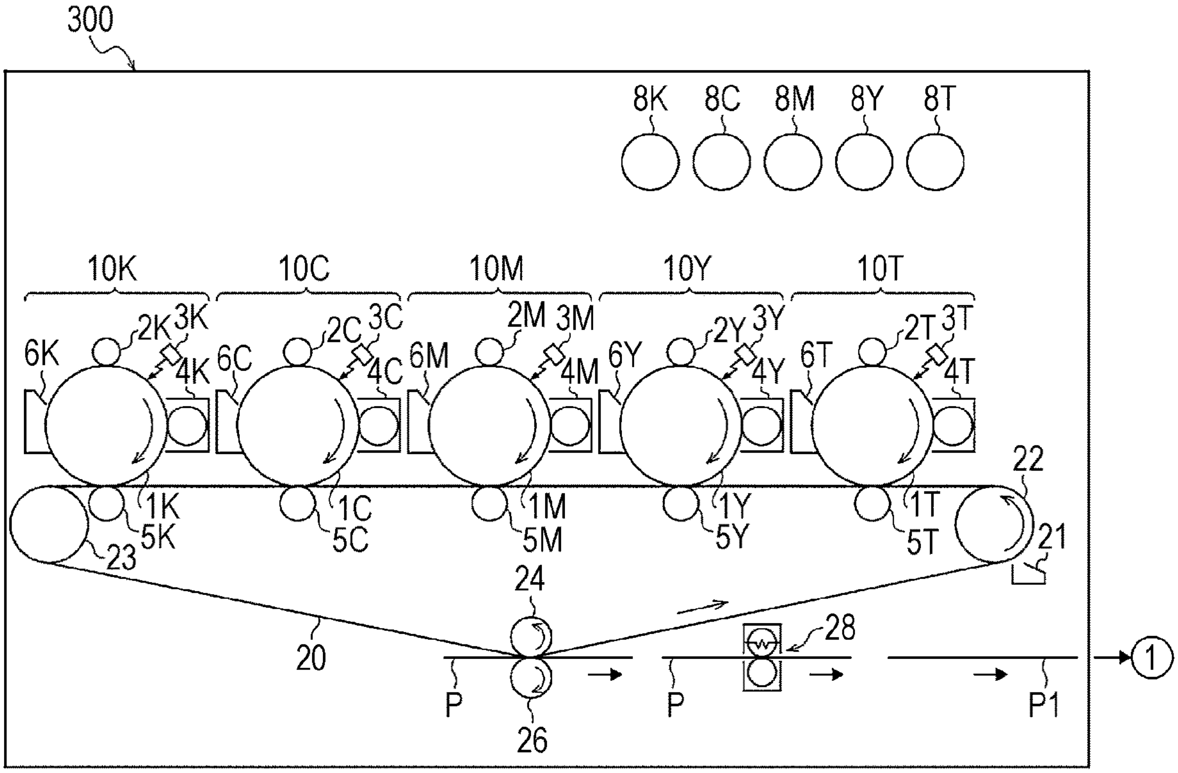
FIG. 2 is a schematic diagram illustrating another example of the apparatus for producing a printed matter according to the exemplary embodiment.
Figure 2:
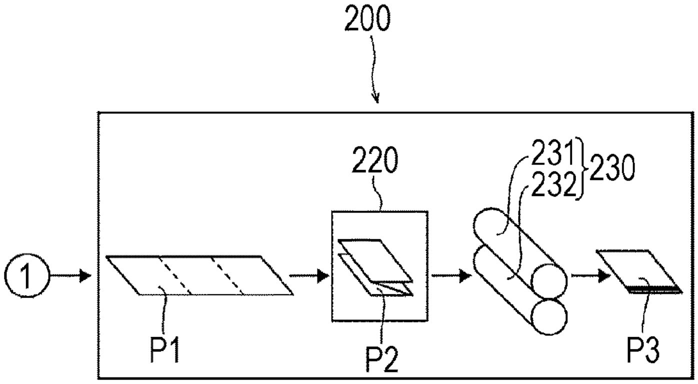

FIG. 2 is a schematic diagram illustrating another example of the apparatus for producing a printed matter of the exemplary embodiment. The apparatus for producing a printed matter illustrated in FIG. 2 is equipped with a printing unit 300 that applies the transparent toner to the recording medium and forms a chromatic color toner image on the recording medium in the same process, and a pressure bonding unit 200 disposed downstream of the printing unit 300.

The printing unit 300 is a five-tandem, intermediate transfer-type printing unit. The printing unit 300 is equipped with a unit 10T that applies a transparent toner (T), and units 10Y, 10M, 10C, and 10K that respectively form of chromatic color toner images of respective colors, yellow (Y), magenta (M), cyan (C), and black (K). The unit 10T is the applying unit that applies a transfer toner to a recording medium P by using a developer that contains the transparent toner. The units 10Y, 10M, 10C, and 10K are, respectively, units that form chromatic color toner images on the recording medium P by using developers that contain the chromatic color toners. The units 10T, 10Y, 10M, 10C, and 10K employ an electrophotographic system.

The units 10T, 10Y, 10M, 10C, and 10K are spaced from each other and arranged side-by-side. The units 10T, 10Y, 10M, 10C, and 10K may be process cartridges detachably attachable to the printing unit 300.

An intermediate transfer belt (an example of the intermediate transfer body) 20 extends under all of the units 10T, 10Y, 10M, 10C, and 10K. The intermediate transfer belt 20 is wound around a driving roll 22, a supporting roll 23, and a counter roll 24 that are in contact with the inner surface of the intermediate transfer belt 20, and is configured to run from the unit 10T toward the unit 10K. An intermediate transfer body cleaning device 21 that opposes the driving roll 22 is disposed on the image-retaining-surface-side of the intermediate transfer belt 20.

The units 10T, 10Y, 10M, 10C, and 10K are respectively equipped with developing devices (one example of the developing unit) 4T, 4Y, 4M, 4C, and 4K. A transparent toner, and a yellow toner, which is a chromatic color toner, a magenta toner, which is a chromatic color toner, a cyan toner, which is a chromatic color toner, and a black toner, which is a chromatic color toner, respectively stored in the toner cartridges 8T, 8Y, 8M, 8C, and 8K are supplied to the developing device 4T, 4Y, 4M, 4C, and 4K.

Since the units 10T, 10Y, 10M, 10C, and 10K are identical in structure and operation, the unit 10T that applies the transparent toner to a recording medium is described as a representative example.

The unit 10T includes a photoreceptor 1T. The photoreceptor 1T are surrounded by, in order of arrangement, a charging roll (one example of the charging unit) 2T that charges a surface of the photoreceptor 1T, an exposing device (one example of the electrostatic charge image forming unit) 3T that exposes the charged surface of the photoreceptor 1T with a laser beam to form an electrostatic charge image, a developing device (one example of the developing unit) 4T that develops the electrostatic charge image by supplying a toner to the electrostatic charge image, a first transfer roll (one example of the first transfer unit) 5T that transfers the developed toner image onto the intermediate transfer belt 20, and a cleaning device (one example of the cleaning unit) 6T that removes the toner remaining on the surface of the photoreceptor 1T after the first transfer. The first transfer roll 5T is disposed on the inner side of the intermediate transfer belt 20 and positioned to oppose the photoreceptor 1T.

Hereinafter, the operation of applying the transparent toner and forming chromatic color toner images on a recording medium P is described by taking the operation of the unit 10T as an example.

First, the surface of the photoreceptor 1T is charged by the charging roll 2T. The charged surface of the photoreceptor 1T is irradiated with a laser beam emitted from the exposing device 3T on the basis of the image data transmitted from a controller (not illustrated in the drawings). As a result, an electrostatic charge image of the application pattern of the transparent toner is formed on the surface of the photoreceptor 1T.

The electrostatic charge image formed on the photoreceptor 1T is rotated to a developing position as the photoreceptor 1T is run. At that developing position, the electrostatic charge image on the photoreceptor 1T is developed by the developing device 4T into a toner image.

The developing device 4T stores a developer that contains at least a transparent toner and a carrier. The transparent toner is frictionally charged by being stirred with the carrier in the developing device 4T, and is held on the developer roll. As the surface of the photoreceptor 1T passes the developing device 4T, the toner electrostatically adheres to the electrostatic charge image on the surface of the photoreceptor 1T, and the electrostatic charge image is developed with the toner. The photoreceptor 1T on which the toner image is formed by the toner is continuously run, and the developed toner image on the photoreceptor 1T is conveyed to a first transfer position.

Once the toner image on the photoreceptor 1T is conveyed to the first transfer position, a first transfer bias is applied to the first transfer roll 5T, an electrostatic force acting from the photoreceptor 1T toward the first transfer roll 5T acts on the toner image, and the toner image on the photoreceptor 1T is transferred onto the intermediate transfer belt 20. The toner remaining on the photoreceptor 1T is removed by the photoreceptor cleaning device 6T and recovered. The photoreceptor cleaning device 6T is, for example, a cleaning blade or a cleaning brush, and is preferably a cleaning brush.

The same operation as the unit 10T is conducted in the units 10Y, 10M, 10C, and 10K as well by using developers that contain chromatic color toners. The intermediate transfer belt 20, onto which a transparent toner layer formed of the transparent toner has been formed in the unit 10T, sequentially passes the units 10Y, 10M, 10C, and 10K, and, as a result, chromatic color toner images of the respective colors are transferred in a superposed manner on the intermediate transfer belt 20.

After the superposing transfer of the five toner images (in other words, a transparent toner layer and four chromatic color toner images) in the units 10T, 10Y, 10M, 10C, and 10K, the intermediate transfer belt 20 reaches a second transfer portion constituted by the intermediate transfer belt 20, the counter roll 24 in contact with the inner surface of the intermediate transfer belt 20, and a second transfer roll (one example of the second transfer unit) 26 disposed on the image-retaining-surface-side of the intermediate transfer belt 20. Meanwhile, a recording medium P is fed, via a feeder mechanism, to a gap between the second transfer roll 26 and the intermediate transfer belt 20, and a second transfer bias is applied to the counter roll 24. At this stage, an electrostatic force from the intermediate transfer belt 20 acting toward the recording medium P acts on the toner images, and the toner images on the intermediate transfer belt 20 are transferred onto the recording medium P.

The recording medium P onto which the toner images have been transferred is conveyed to a thermal fixing device (one example of the thermal fixing unit) 28. The thermal fixing device 28 is equipped with a heating source such as a halogen heater, and heats the recording medium P. The surface temperature of the recording medium P heated by the thermal fixing device 28 is preferably 150° C. or higher and 220° C. or lower, more preferably 155° C. or higher and 210° C. or lower, and yet more preferably 160° C. or higher and 200° C. or lower. As the recording medium P passes the thermal fixing device 28, the chromatic color toner images are thermally fixed onto the recording medium P.

From the viewpoint of suppressing detachment of the transparent toner from the recording medium P and the viewpoint of improving the fixability of the chromatic color toner images onto the recording medium P, the thermal fixing device 28 may be a device that applies both heat and pressure, and may be a pair of fixing members (roll/roll or belt/roll) equipped with a heating source inside, for example. When the thermal fixing device 28 applies pressure, the pressure that the thermal fixing device 28 applies to the recording medium P may be lower than the pressure that the pressurizing device 230 applies to the recording medium P2, and may specifically be 0.2 MPa or more and 1 MPa or less.

As the recording medium P passes the printing unit 300, the recording medium P turns into a recording medium P1 on which the chromatic color toner images and the transparent toner are disposed. The recording medium P1 is then conveyed toward the pressure bonding unit 200.

The structure of the pressure bonding unit 200 illustrated in FIG. 2 may be identical to that of the pressure bonding unit 200 illustrated in FIG. 1, and the detailed description of the structure and operation of the pressure bonding unit 200 are omitted.

In the apparatus for producing a printed matter of this exemplary embodiment, the printing unit 300 and the pressure bonding unit 200 may be close to each other or remote from each other. When the printing unit 300 and the pressure bonding unit 200 are remote from each other, the printing unit 300 and the pressure bonding unit 200 are, for example, linked through a conveying unit (for example, a belt conveyor) that conveys the recording medium P1.

An apparatus for producing a printed matter according to the exemplary embodiment may be equipped with a cutting unit that cuts a recording medium into a predetermined size. Examples of the cutting unit include a cutting unit that is disposed between the printing unit 300 and the pressure bonding unit 200 and cuts off a part of the recording medium P1, the part being a region where no transparent toner is disposed; a cutting unit that is disposed between the folding device 220 and the pressurizing device 230 and cuts off a part of the recording medium P2, the part being a region where no transparent toner is disposed; and a cutting unit that is disposed downstream of the pressure bonding unit 200 and cuts off a part of the pressure-bonded printed matter P3, the part being a region not bonded with the transparent toner.

The apparatus for producing a printed matter according to the exemplary embodiment is not limited to a single sheet-type apparatus. The apparatus for producing a printed matter according to this exemplary embodiment may be of a type that performs a chromatic color toner image forming step, an applying step and the pressure bonding step on a long recording medium to form a long pressure bonded printed matter, and then cuts the long pressure bonded printed matter into a predetermined size.

Process Cartridge Set

A process cartridge set according to an exemplary embodiment will now be described.

A process cartridge set according to an exemplary embodiment is detachably attachable to an apparatus for producing a printed matter, and includes: a first process cartridge equipped with a first developing unit that stores an electrostatic charge image developer containing the chromatic color toner in the particle set for producing a printed matter of the exemplary embodiment and that develops a chromatic color toner image-forming electrostatic charge image on a surface of a photoreceptor into a chromatic color toner image by using the electrostatic charge image developer containing the chromatic color toner; and a second process cartridge equipped with a second developing unit that stores an electrostatic charge image developer containing, as a toner, the pressure-responsive particles in the particle set for producing a printed matter of the exemplary embodiment and that develops a pressure-responsive particle layer-forming electrostatic charge image on the surface of the photoreceptor into a pressure-responsive particle layer by using the electrostatic charge image developer containing, as the toner, the pressure-responsive particles.

Each of the process cartridges that constitute the process cartridge set according to this exemplary embodiment may be equipped with a developing unit, and, if needed, at least one selected from a photoreceptor, a charging unit, an electrostatic charge image forming unit, a transfer unit, and other units.

Hereinafter, one example of the process cartridge set is described, but the exemplary embodiment is not limited to this example. In the description below, only the relevant parts in the drawing are described, and descriptions for other parts are omitted.

Figure 3:
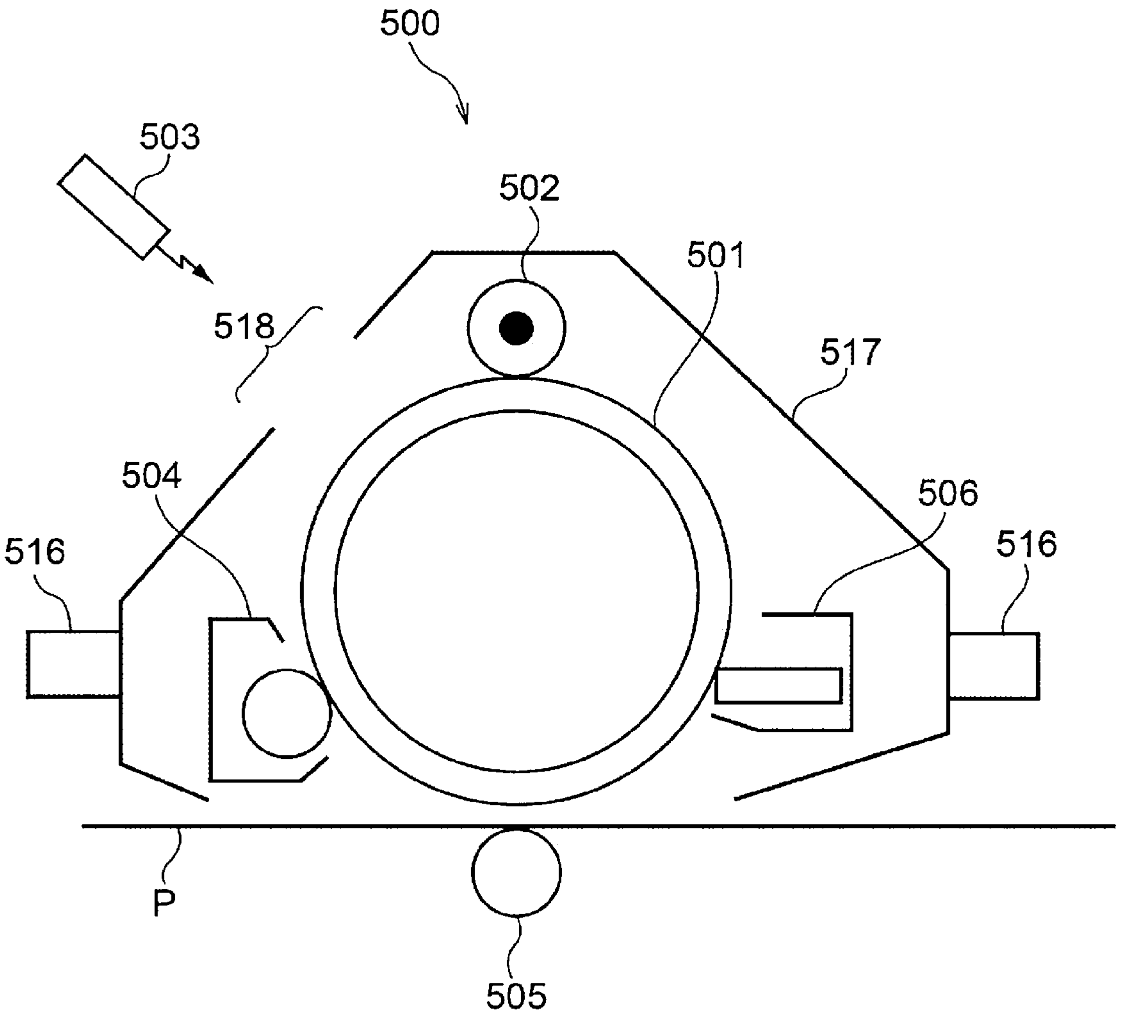
FIG. 3 is a schematic diagram illustrating one example of a first process cartridge constituting a process cartridge set according to an exemplary embodiment.

FIG. 3 is a schematic diagram illustrating one example of a first process cartridge that constitutes the process cartridge set of the exemplary embodiment.

A process cartridge 500 illustrated in FIG. 3 is, for example, detachably attachable to an the apparatus for producing a printed matter illustrated in FIG. 1 or 2.

The process cartridge 500 is a cartridge obtained by using a casing 517 to integrate a photoreceptor 501, and a charging roll 502 (one example of the charging unit), a developing device 504 (one example of the developing unit), and a photoreceptor cleaning device 506 (one example of the cleaning unit) provided around the photoreceptor 501. The casing 517 has an opening 518 for exposure. The casing 517 has a guide rail 516, and the process cartridge 500 is attached to the apparatus for producing a printed matter via the guide rail 516.

FIG. 3 also illustrates a recording medium P, and an exposing device 503 and a transfer device 505 disposed around the process cartridge 500 when the process cartridge 500 is attached to the apparatus for producing a printed matter.

Cartridge Set

A cartridge set according to an exemplary embodiment is detachably attachable to an apparatus for producing a printed matter, and includes a first cartridge that stores the chromatic color toner in the particle set for producing a printed matter of the exemplary embodiment, and a second cartridge that stores the pressure-responsive particles in the particle set for producing a printed matter of the exemplary embodiment. Each of the cartridges constituting the cartridge set stores a replenishing toner to be supplied to a developing unit disposed inside the apparatus for producing a printed matter.

The printing unit 300 illustrated in FIG. 2 has a structure that allows the cartridge set constituted by cartridges 8T, 8Y, 8M, 8C, and 8K to be attached and detached, and the developing devices 4T, 4Y, 4M, 4C, and 4K are respectively connected to the cartridges 8T, 8Y, 8M, 8C, and 8K via supplying pipes not illustrated in the drawings. The cartridge 8T, which is the first cartridge constituting the cartridge set of the exemplary embodiment, stores the pressure-responsive particles. Meanwhile, the cartridges 8Y, 8M, 8C, and 8K, which are the second cartridges constituting the cartridge set of the exemplary embodiment, respectively store yellow, magenta, cyan, and black chromatic color toners. When the toner level in the cartridge has run low, the cartridge is replaced.

EXAMPLES

Examples will now be described, but these examples do not limit the scope of the present disclosure. In the description below, "parts" and "%" are on a mass basis unless otherwise noted.

Preparation of Pressure-Responsive Particles

Preparation of Pressure-Responsive Particles (B1)

Preparation of Releasing Agent Dispersion (1)

Fischer-Tropsch wax: 270 parts
(trade name: FNP-0090 produced by Nippon Seiro Co., Ltd., melting temperature: 90° C.)
Anionic surfactant: 1.0 part
(NEOGEN RK, produced by DKS Co., Ltd.)
Ion exchange water: 400 parts The aforementioned components are mixed and heated to 95° C. The resulting mixture is dispersed in a homogenizer (ULTRA-TURRAX T50 produced by IKA Japan), and then dispersed in a Manton-Gaulin high-pressure homogenizer (produced by Gaulin Company) for 360 minutes to prepare a releasing agent dispersion (1) (solid concentration: 20 mass %) in which releasing agent particles having a volume average particle diameter of 0.23 μm are dispersed.

Styrene Resin Particle Dispersion Preparation Step

Styrene (as polymerization component): 370 parts
n-Butyl acrylate (as polymerization component): 115 parts
Acrylic acid (as polymerization component): 15 parts
Dodecanethiol (as chain transfer agent): 7.5 parts The above-described materials are mixed and dissolved to prepare a monomer solution (1).

In 205 parts of ion exchange water, 8 parts of an anionic surfactant (DOWFAX 2A1 produced by The Dow Chemical Company) is dissolved, the monomer solution (1) is added thereto, and the resulting mixture is dispersed to obtain an emulsion.

In 462 parts of ion exchange water, 2.2 parts of the aforementioned anionic surfactant is dissolved. The resulting solution is charged into a polymerization flask equipped with a stirrer, a thermometer, a reflux cooling tube, and a nitrogen inlet tube, heated to 73° C. under stirring, and retained thereat. In 21 parts of ion exchange water, 3 parts of ammonium persulfate is dissolved, and the resulting solution is added dropwise to the aforementioned polymerization flask over a period of 15 minutes via a metering pump. Then, the aforementioned emulsion is added dropwise thereto over a period of 160 minutes via a metering pump. Subsequently, while slow stirring is continued, the polymerization flask is retained at 75° C. for 3 hours, and then the temperature is returned to room temperature.

As a result, a styrene resin particle dispersion (St1) that has a volume average particle diameter (D50v) of 220 nm, a weight average molecular weight of 33000 as determined by GPC (UV detection), a glass transition temperature of 53° C., and a solid content of 42% is obtained.

Composite Resin Particle Forming Step

Styrene resin particle dispersion (St1): the amount at which the solid content is 600 parts
2-Ethylhexyl acrylate: 250 parts
n-Butyl acrylate: 150 parts
Ion exchange water: 1080 parts The above-described materials are charged into a polymerization flask to prepare a monomer solution (2). This solution is slowly stirred for 2 hours. Subsequently, while continuing the stirring, the temperature is elevated to 70° C., and 4.5 parts of ammonium persulfate and 100 parts of ion exchange water are added thereto dropwise via a metering pump over a period of 30 minutes. Subsequently, while continuing the stirring, the mixture is retained for 3 hours, and then the polymerization is terminated. Through the above-described steps, a composite resin particle dispersion SM1 in which composite resin particles having a volume average particle diameter of 219 nm and a weight average molecular weight of 220,000 are dispersed and in which ion exchange water is added to adjust the solid content to 30 mass % is obtained.

The resin particles in the obtained composite resin particle dispersion SM1 are dried, and the glass transition temperature Tg behavior of the dry resin particles is analyzed with a differential scanning calorimeter (DSC) produced by Shimadzu Corporation from −150° C. to 100° C. As a result, glass transition attributable to a low Tg (meth)acrylate resin is observed at −50° C. In addition, glass transition attributable to a high Tg styrene resin is observed at 54° C. (difference in glass transition temperature: 104° C.)

Aggregated Particle Forming Step/Fusing and Coalescing Step

Composite resin particle dispersion SM1: 840 parts
Releasing agent dispersion (1): 10.5 parts
Colloidal silica aqueous solution: 13 parts
(SNOWTEX OS produced by Nissan Chemical Corporation)
Ion exchange water: 800 parts
Anionic surfactant: 1 part
(DOWFAX 2A1 produced by The Dow Chemical Company)

The aforementioned components serving as core-forming materials are placed in a 3 L reactor equipped with a thermometer, a pH meter, and a stirrer, and 1.0 mass % nitric acid is added thereto at a temperature of 25° C. to adjust pH to 3.0. Subsequently, the resulting mixture is dispersed in a homogenizer (ULTRA-TURRAX T50 produced by IKA Japan) at 5,000 rpm during which 0.3 parts of a 10 mass % aqueous polyaluminum chloride solution is added. The resulting mixture is further dispersed for 6 minutes.

Subsequently, a stirrer and a heating mantle are attached to the reactor. While the rotation speed of the stirrer is adjusted to thoroughly stir the slurry, the temperature is elevated at a temperature elevation rate of 0.2° C./min up to a temperature of 40° C. and then at 0.05° C./min beyond 40° C. The particle diameter is measured every 10 minutes with MULTISIZER II (aperture diameter: 50 μm, produced by Coulter Inc.). The temperature is retained when the volume average particle diameter of the aggregated particles reached 10 μm, and 150 parts of the styrene resin particle dispersion (St1) serving as a shell-forming material is added thereto over a period of 5 minutes. The resulting mixture is retained for 30 minutes, and then the pH is adjusted to 6.0 by using a 1 mass % aqueous sodium hydroxide solution. Subsequently, while the pH is adjusted to 6.0 in the same manner every 5° C., the temperature is elevated at a temperature elevation rate of 1° C./min up to 90° C., and the temperature is retained at 96° C. The particle shape and the surface property are observed with an optical microscope and a scanning electron microscope (FE-SEM), and coalescence of particles is confirmed 2.0 hours after start of retaining the temperature of 96° C. The reactor is then cooled with cooling water over a period of 5 minutes to 30° C.

The cooled slurry is passed through a nylon mesh having 30 μm opening to remove coarse powder, and the slurry that has passed through the mesh is filtered at a reduced pressure by using an aspirator. Particles remaining on the filter are manually disintegrated as finely as possible, and then the disintegrated particles are washed with ion exchange water having a temperature of 30° C. The washed particles are finely pulverized with a wet-dry-type particle sizer (Comil) and then vacuum-dried in a dryer at 25° C. for 36 hours. As a result, base particles (B1) are obtained. The obtained base particles (B1) have a volume average particle diameter of 10.5 μm and a circularity of 0.965. Preparation of pressure-responsive particles (B1)

To 100 hundred parts of the obtained base particles (B1), 0.5 parts of hydrophobic silica (RY50 produced by Nippon Aerosil Co., Ltd.) is added, and the resulting mixture is mixed in a sample mill at 13,000 rpm for 30 seconds. Subsequently, the resulting mixture is sieved through a vibrating screen having 106 μm openings to obtain pressure-responsive particles (B1).

Preparation of Pressure-Responsive Particles B2 to B8

Pressure-responsive particles B2 to B8 are prepared as with the pressure-responsive particles (B1) except that the composition of the monomer solution (2) placed in the polymerization flask in the composite resin particle forming step and the volume average particle diameter of the aggregated particles prepared in the aggregated particle forming step in preparing the pressure-responsive particles (B1) are changed as indicated in Table 1.

Abbreviations in Table 1 are as follows.

2EHA: 2-ethylhexyl acrylate

BA: n-butyl acrylate

Preparation of Pressure-Responsive Particles B9 to B16

Pressure-responsive particles B9 to B16 are prepared as with the pressure-responsive particles (B1) except that the amount of the releasing agent dispersion (1) added in the aggregated particle forming step/fusing and coalescing step and the volume average particle diameter of the aggregated particles prepared in the aggregated particle forming step are changed as indicated in Table 1.

Preparation of Pressure-Responsive Particles B17

Pressure-responsive particles B17 are prepared as with the pressure-responsive particles (B1) except that, in the aggregated particle forming step/fusing and coalescing step, after the temperature is retained when the volume average particle diameter of the aggregated particles reached 10.2 μm, addition of the styrene resin particle dispersion (St1) serving as a shell-forming material is omitted.

Preparation of Pressure-Responsive Particles B18 to B22

Pressure-responsive particles B18 to B22 are prepared as with the pressure-responsive particles (B1) except that, in the aggregated particle forming step/fusing and coalescing step, a dispersion prepared by mixing 150 parts of the styrene resin particle dispersion (St1) serving as the shell-forming material and a coloring agent particle dispersion indicated in Table 1 is added instead of 150 parts of the styrene resin particle dispersion (St1) serving as the shell-forming material.

The amount of the coloring agent particle dispersion mixed with the styrene resin particle dispersion (St1) is as indicated in Table 1.

Here, the coloring agent particle dispersion used to prepare the pressure-responsive particles B18 to B22 is prepared by the following process.

Preparation of Pigment Dispersion C

Cyan pigment (C.I. Pigment Blue 15:3): 50 parts

Ionic surfactant (NEOGEN RK, produced by DKS Co., Ltd.): 5 parts

Ion exchange water: 195 parts

The aforementioned components are mixed, dispersed in a homogenizer (IKA ULTRA-TURRAX) for 10 minutes, and then dispersed in Altimizer (collision-type wet grinder produced by SUGINO MACHINE LIMITED) at 250 MPa for 15 minutes. Ion exchange water is added to the resulting mixture to prepare a cyan pigment dispersion (solid content: 2%) in which a cyan pigment having a volume-average particle diameter of 126 nm is dispersed.

Preparation of Pigment Dispersion M

Magenta pigment (C.I. Pigment Red 122): 50 parts

Ionic surfactant (NEOGEN RK, produced by DKS Co., Ltd.): 5 parts

Ion exchange water: 195 parts

The aforementioned components are mixed, dispersed in a homogenizer (IKA ULTRA-TURRAX) for 10 minutes, and then dispersed in Altimizer (collision-type wet grinder produced by SUGINO MACHINE LIMITED) at 250 MPa for 15 minutes. Ion exchange water is added to the resulting mixture to prepare a magenta pigment dispersion (solid content: 2%) in which a magenta pigment having a volume-average particle diameter of 146 nm is dispersed.

Preparation of Pigment Dispersion Y

Yellow pigment (C.I. Pigment Yellow 74): 50 parts

Ionic surfactant (NEOGEN RK, produced by DKS Co., Ltd.): 5 parts

Ion exchange water: 195 parts

The aforementioned components are mixed, dispersed in a homogenizer (IKA ULTRA-TURRAX) for 10 minutes, and then dispersed in Altimizer (collision-type wet grinder produced by SUGINO MACHINE LIMITED) at 250 MPa for 15 minutes. Ion exchange water is added to the resulting mixture to prepare a yellow pigment dispersion (solid content: 2%) in which a yellow pigment having a volume-average particle diameter of 130 nm is dispersed.

Preparation of Pigment Dispersion B

Black pigment (carbon black Regal 330 produced by Cabot Corporation): 50 parts

Ionic surfactant (NEOGEN RK, produced by DKS Co., Ltd.): 5 parts

Ion exchange water: 195 parts

The aforementioned components are mixed, dispersed in a homogenizer (IKA ULTRA-TURRAX) for 10 minutes, and then dispersed in Altimizer (collision-type wet grinder produced by SUGINO MACHINE LIMITED) at 250 MPa for 15 minutes. Ion exchange water is added to the resulting mixture to prepare a black pigment dispersion (solid content: 2%) in which a black pigment having a volume-average particle diameter of 135 nm is dispersed.

The volume average particle diameter of the pigment in the pigment dispersion is determined by measuring the particle diameter with a laser diffraction particle size distribution meter (for example, LA-700 produced by Horiba Ltd.) and determining the particle diameter at 50% accumulation in a volume-based particle size distribution calculated from the small diameter side. The result is assumed to be the volume average particle diameter (D50v).

T1 and T2 of the pressure-responsive particles B1 to B22 determined by the aforementioned method satisfy formula 2: 10° C.≤T1−T2.

The pigment content (ppm) in the base particles B relative to the entirety of the base particles B contained in the pressure-responsive particles B1 to B22 are as indicated in Table 1.

TABLE 1

| Type of pressure-responsive particles | Production conditions: Composition of monomer solution (2): St1 (number of parts of solid matter) | 2EHA (parts) | BA (parts) | Ion exchange water (parts) | Volume average particle diameter of aggregated particles (μm) | Amount of releasing agent dispersion (1) added (parts) | Type of coloring agent particle dispersion | Amount of coloring agent particle dispersion added (parts) | Base particles B: Pigment content in base particles B (ppm) |
|---|---|---|---|---|---|---|---|---|---|
| B1 | 600 | 250 | 150 | 1080 | 10.5 | 10.5 | — | 0 | 0 |
| B2 | 600 | 321 | 87 | 1080 | 10.1 | 10.5 | — | 0 | 0 |
| B3 | 600 | 100 | 285 | 1080 | 9.3 | 10.5 | — | 0 | 0 |
| B4 | 600 | 250 | 150 | 1080 | 6.7 | 10.5 | — | 0 | 0 |
| B5 | 600 | 250 | 150 | 1080 | 19 | 10.5 | — | 0 | 0 |
| B6 | 600 | 250 | 150 | 1080 | 6.2 | 10.5 | — | 0 | 0 |
| B7 | 600 | 250 | 150 | 1080 | 20.5 | 10.5 | — | 0 | 0 |
| B8 | 600 | 346 | 64 | 1080 | 8.7 | 10.5 | — | 0 | 0 |
| B9 | 600 | 250 | 150 | 1080 | 9.8 | 2.1 | — | 0 | 0 |
| B10 | 600 | 250 | 150 | 1080 | 9.7 | 2.5 | — | 0 | 0 |
| B11 | 600 | 250 | 150 | 1080 | 10 | 18.0 | — | 0 | 0 |
| B12 | 600 | 250 | 150 | 1080 | 10.1 | 19.0 | — | 0 | 0 |
| B13 | 600 | 250 | 150 | 1080 | 8.8 | 0.5 | — | 0 | 0 |
| B14 | 600 | 250 | 150 | 1080 | 10.2 | 0.6 | — | 0 | 0 |
| B15 | 600 | 250 | 150 | 1080 | 9.8 | 19.0 | — | 0 | 0 |
| B16 | 600 | 250 | 150 | 1080 | 10.1 | 20.5 | — | 0 | 0 |
| B17 | 600 | 250 | 150 | 1080 | 10.2 | 10.0 | — | 0 | 0 |
| B18 | 600 | 250 | 150 | 1080 | 10.2 | 10.5 | C | 0.75 | 69 |
| B19 | 600 | 250 | 150 | 1080 | 9.8 | 10.5 | M | 0.5 | 49 |
| B20 | 600 | 250 | 150 | 1080 | 9.5 | 10.5 | Y | 0.98 | 90 |
| B21 | 600 | 250 | 150 | 1080 | 10.5 | 10.5 | K | 0.24 | 22 |
| B22 | 600 | 250 | 150 | 1080 | 10.1 | 10.5 | M | 30 | 303 |

Preparation of Chromatic Color Toner

Preparation of Chromatic Color Toner (A1)

Preparation of Amorphous Polyester Resin Dispersion (A1)

Ethylene glycol: 37 parts

Neopentyl glycol: 65 parts 1,9-Nonanediol: 32 parts

Terephthalic acid: 96 parts

The aforementioned materials are placed in a flask, and the temperature is elevated to 200° C. over a period of 1 hour. After confirming that the interior of the reaction system is evenly stirred, 1.2 parts of dibutyltin oxide is added. The temperature is elevated to 240° C. over a period of 6 hours while distilling away generated water, and stirring is continued for 4 hours at 240° C. As a result, an amorphous polyester resin (acid value: 9.4 mgKOH/g, weight average molecular weight: 13,000, glass transition temperature: 62° C.) is obtained. The amorphous polyester resin in a molten state is transported to an emulsifying disperser (CAVITRON CD1010 produced by EuroTec Co., Ltd.) at a speed of 100 g per minute. Separately, a diluted ammonia water having a concentration of 0.37% obtained by diluting reagent ammonia water with ion exchange water is placed in a tank. While heating the diluted ammonia water to 120° C. with a heat exchanger, the diluted ammonia water and the amorphous polyester resin are transported to an emulsifying disperser at a speed of 0.1 L per minute. The emulsifying disperser is operated at a rotator rotation speed of 60 Hz and a pressure of 5 kg/cm$^2$, and an amorphous polyester resin dispersion (A1) having a volume average particle diameter of 160 nm and a solid content of 20% is obtained.

Preparation of Crystalline Polyester Resin Dispersion (C1)

Decanedioic acid: 81 parts

Hexanediol: 47 parts

The aforementioned materials are placed in a flask, and the temperature is elevated to 160° C. over a period of 1 hour. After confirming that the interior of the reaction system is evenly stirred, 0.03 parts of dibutyltin oxide is added. The temperature is elevated to 200° C. over a period of 6 hours while distilling away generated water, and stirring is continued for 4 hours at 200° C. Next, the reaction solution is cooled and subjected to solid-liquid separation. The solid matter is dried at a temperature of 40° C. at a reduced pressure to thereby obtain a crystalline polyester resin (C1) (melting point: 64° C., weight average molecular weight: 15,000).

Crystalline polyester resin (C1): 50 parts

Anionic surfactant (NEOGEN RK, produced by DKS Co., Ltd.): 2 parts

Ion exchange water: 200 parts

The aforementioned materials are heated to 120° C., thoroughly dispersed by using a homogenizer (ULTRA-TURRAX T50 produced by IKA Japan), and dispersed by using a pressure ejection homogenizer. The mixture is recovered after the volume average particle diameter has reached 180 nm to obtain a crystalline polyester resin dispersion (C1) having a solid content of 20%.

Preparation of Releasing Agent Particle Dispersion (W1)

Paraffin wax (HNP-9 produced by Nippon Seiro Co., Ltd.): 100 parts

Anionic surfactant (NEOGEN RK, produced by DKS Co., Ltd.): 1 part

Ion exchange water: 350 parts

The aforementioned materials are mixed and heated to 100° C. The resulting mixture is dispersed by using a homogenizer (ULTRA-TURRAX T50 produced by IKA Japan) then dispersed by using a pressure discharging Manton-Gaulin homogenizer to obtain a releasing agent particle dispersion in which releasing agent particles having a volume average particle diameter of 200 nm are dispersed. Ion exchange water is added to the releasing agent particle dispersion to adjust the solid content to 20%, and to thereby obtain a releasing agent particle dispersion (W1).

Preparation of Coloring Agent Particle Dispersion (M1)

Magenta Pigment (Pigment Red 122 Produced by DIC Corporation): 50 parts

Anionic surfactant (NEOGEN RK, produced by DKS Co., Ltd.): 5 parts

Ion exchange water: 195 parts

The aforementioned materials are mixed and dispersed in a high-pressure collision-type disperser (Altimizer HJP30006 produced by SUGINO MACHINE LIMITED) for 60 minutes to thereby obtain a coloring agent particle dispersion (M1) having a solid content of 20%.

Preparation of Chromatic Color Particles (A1)

Ion exchange water: 200 parts

Amorphous polyester resin dispersion (A1): 150 parts

Crystalline polyester resin dispersion (C1): 10 parts

Releasing agent particle dispersion (W1): 22.5 parts

Coloring agent particle dispersion (M1): 15 parts

Anionic surfactant (TAYCAPOWER): 2.8 parts

The aforementioned materials are placed in a round stainless steel flask, 0.1 N nitric acid is added to adjust the pH to 3.5, and then an aqueous polyaluminum chloride solution prepared by dissolving 2 parts of polyaluminum chloride (30% powder product produced by Oji Paper Co., Ltd.) in 30 parts of ion exchange water is added thereto. The resulting mixture is dispersed by using a homogenizer (ULTRA-TURRAX T50 produced by IKA Japan) at 30° C., then heated in a heating oil bath up to 45° C., and retained thereat until the volume average particle diameter reaches 5.0 μm. Next, 60 parts of the amorphous polyester resin dispersion (A1) is added, and the resulting mixture is retained for 30 minutes. Next, as the volume average particle diameter reaches 5.2 μm, another 60 parts of the amorphous polyester resin dispersion (A1) is added, and the resulting mixture is retained for 30 minutes. Next, 20 parts of a 10% aqueous nitrilotriacetic acid (NTA) metal salt solution (Chelest 70 produced by Chelest Corporation) is added, and a 1 N aqueous sodium hydroxide solution is added to adjust the pH to 9.0. Next, 1 part of an anionic surfactant (TAYCAPOWER) is added, and the resulting mixture is heated to 85° C. under stirring, and retained thereat for 5 hours. The resulting mixture is then cooled to 20° C. at a rate of 20° C./min. The resulting mixture is then filtered, thoroughly washed with ion exchange water, and dried. As a result, chromatic color toner particles (A1) having a volume average particle diameter of 5.0 μm and an average circularity of 0.971 are obtained.

Preparation of Chromatic Color Toner (A1)

One hundred parts of the chromatic color toner particles (A1) and 1.3 parts of a hydrophobic silica (NY50 produced by Nippon Aerosil Co., Ltd.) having an average particle diameter of 30 nm are mixed, and the resulting mixture is blended for 10 minutes in a Henschel mixer at a peripheral speed of 32 m/s. The resulting product is sieved through a vibrating sieve having 45 μm openings to remove coarse particles and obtain a chromatic color toner (A1).

Preparation of Chromatic Color Toner (A2)

Preparation of Resin Particle Dispersion (A2)

Styrene (produced by Wako Pure Chemical Industries, Ltd.): 330 parts by mass n-Butyl acrylate (produced by Wako Pure Chemical Industries, Ltd.): 60 parts by mass Dodecanethiol (produced by Wako Pure Chemical Industries, Ltd.): 3.1 parts by mass In a flask, a solution prepared by mixing and dissolving the aforementioned components is emulsified and dispersed in a solution prepared by dissolving 6 parts by mass of a nonionic surfactant (NONIPOL 400 produced by Sanyo Chemical Industries Ltd.) and 10 parts by mass of an anionic surfactant (NEOGEN SC, produced by DKS Co., Ltd.) in 550 parts by mass of ion exchange water, and, while the resulting mixture is slowly mixed for 10 minutes, 50 parts by mass of ion exchange water in which 4 parts by mass of ammonium persulfate is dissolved is added to the resulting mixture. After nitrogen purging, while the content of the flask is stirred, the content is heated on an oil bath up to 70° C., and emulsification polymerization is continued for 5 hours. As a result, a resin particle dispersion (A2) in which styrene acryl resin particles having a volume average particle diameter D50v of 104 nm, a glass transition temperature Tg of 59° C., and a weight average molecular weight of 34,000 are dispersed is obtained.

Preparation of Resin Particle Dispersion (A2-2)

Styrene: 300 parts by mass n-Butyl acrylate: 90 parts by mass

Acrylic resin: 0.1 parts by mass

Dodecanethiol: 2.8 parts by mass 2-(Dimethylamino) methacrylate: 1.0 part by mass In a flask, a solution prepared by mixing the aforementioned components is emulsified and dispersed in a solution prepared by dissolving 6 parts by mass of a nonionic surfactant (NONIPOL 400 produced by Sanyo Chemical Industries Ltd.) and 10 parts by mass of an anionic surfactant (NEOGEN SC, produced by DKS Co., Ltd.) in 550 parts by mass of ion exchange water, and, while the resulting mixture is slowly mixed for 10 minutes, 50 parts by mass of ion exchange water in which 4 parts by mass of ammonium persulfate is dissolved is added to the resulting mixture. After nitrogen purging, while the content of the flask is stirred, the content is heated on an oil bath up to 70° C., and emulsification polymerization is continued for 5 hours. As a result, a resin particle dispersion (A2-2) in which resin particles having a volume average particle diameter D50v of 120 nm, a glass transition temperature Tg of 52° C., and a weight average molecular weight of 35,000 are dispersed is obtained.

Preparation of Chromatic Color Particles (A2)

Resin particle dispersion (A2): 402.5 parts

Coloring agent particle dispersion (M1): 12.5 parts

Releasing agent particle dispersion (W1): 50 parts

Anionic surfactant (TAYCAPOWER produced by TAYCA Co., Ltd.): 2 parts

The aforementioned materials are placed in a round stainless steel flask, 0.1 mol/L nitric acid is added to adjust the pH to 3.5, and then 30 parts of an aqueous nitric acid solution having a polyaluminum chloride concentration of 10% is added. Next, the resulting mixture is dispersed by using a homogenizer (ULTRA-TURRAX T50 produced by IKA Japan) at 30° C., then heated in a heating oil bath up to 45° C., and retained thereat until the volume average particle diameter reaches 5.2 μm. Subsequently, 100 parts of the resin particle dispersion (A2-2) is added, the resulting mixture is retained for 1 hour, and a 0.1 mol/L aqueous sodium hydroxide solution is added to adjust the pH to 8.5. Then the resulting mixture is heated to 78° C. under stirring, and then retained for 10 hours. Subsequently, the resulting mixture is cooled at a rate of 20° C./min to 30° C., 0.1 mol/L nitric acid is added to adjust the pH to 4.0, and the resulting mixture is heated again in a heating oil bath up to 60° C. and retained for 3 hours. The resulting mixture is then cooled at a rate of 20° C./min to 20° C., filtered, thoroughly washed with ion exchange water, and dried. As a result, chromatic color toner particles (A2) having a volume average particle diameter of 6.2 μm are obtained.

Preparation of Chromatic Color Toner (A2)

A chromatic color toner (A2) is obtained by externally adding hydrophobic silica to the chromatic color toner particles (A2) and removing coarse particles in the toner through the same process as those in producing the chromatic color toner (A1).

Preparation of Chromatic Color Toners (A3) to (A6)

Chromatic color toners (A3) to (A6) are obtained as with the chromatic color toner (A1) except that the amount of the releasing agent particle dispersion (W1) added is adjusted so that the releasing agent content $W_A$ is the value indicated in Table 2.

Preparation of Carrier

A mixture containing 14 parts of toluene, 2 parts of a styrene-methyl methacrylate copolymer (mass ratio: 80/20, weight average molecular weight: 70,000), and 0.6 parts of zinc oxide (MZ500 produced by Titan Kogyo, Ltd.) is stirred with a stirrer for 10 minutes to prepare a coating layer-forming solution in which zinc oxide is dispersed. Next, this coating layer-forming solution and 100 parts of ferrite particles (volume average particle diameter: 38 μm) are placed in a vacuum deaeration kneader, stirred at 60° C. for 30 minutes, deaerated under heating while reducing the pressure, and dried. As a result, a carrier is obtained.

Examples 1 to 21 and Comparative Examples 1 and 2

Preparation of Developer Containing Chromatic Color Toner

A developer containing a chromatic color toner is prepared by mixing 8 parts of the chromatic color toner and 100 parts of the carrier indicated in Table 2 by using a V blender.

Preparation of Developer Containing Pressure-Responsive Particles

A developer containing pressure-responsive particles is prepared by mixing 8 parts of the pressure-responsive particles and 100 parts of the carrier indicated in Table 2 by using a V blender.

Evaluation

Evaluation of Adhesiveness

As an apparatus for producing a printed matter, an apparatus (Iridesse production press) of a type illustrated in FIG. 2 is prepared. In other words, a printed matter production apparatus equipped with an intermediate transfer-type printing unit that performs application of the pressure-responsive particles onto a recording medium and formation of a color image in the same process, and a pressure bonding unit that has a folding device and a pressurizing device is prepared.

The developer containing the chromatic color toner and the developer containing the pressure-responsive particles obtained in each of the examples is introduced to the developing machine. Recording sheets (OK Prince high-grade paper produced by Oji Paper Co., Ltd.) are loaded onto the apparatus for producing a printed matter, a whole-area halftone image having an image density of 40% is developed with the chromatic color toner and, a halftone image having an image density of 50% is developed by using the pressure-responsive particles on that whole-area halftone image so as to obtain a printed image. Subsequently, the recording sheet is folded in two so that the images come into contact with each other, passed through a sealer (Pressle multi2 produced by Toppan Forms Co., Ltd.) to apply pressure (Gap 10 setting (equivalent to a pressure of 95 MPa)), left to stand overnight, and cut into a width of 15 mm to prepare a test piece. A 90 degree peel test is performed on this test piece.

The peeling speed of the 90 degree peel test is set to 20 mm/min, the load (N) from 10 mm to 50 mm after start of measurement is sampled at 0.4 mm intervals, and the results are averaged. The load (N) needed for peeling is rated as follows to evaluate the tack strength. Evaluation results are indicated in Table 2.

A: 0.8 N or more

B: 0.6 N or more but less than 0.8 N

C: 0.4 N or more but less than 0.6 N

D: less than 0.4 N

Evaluation of Storage Property of Dispersion

The dispersion is hermetically stored in a 30° C. chamber for a month, and the particle size distribution is measured with a LS Coulter. If aggregated particles occur, the particle size distribution assumes a bimodal distribution having a peak on the coarse particle size in the measurement results of the volume average particle size distribution. The storage property of the dispersion is evaluated by the following evaluation standard. Evaluation results are indicated in Table 2.

A: The monomodal distribution remains unchanged.

B: The particle size distribution becomes bimodal but returns to monomodal by re-dispersing.

C: The particle size distribution remains bimodal even after re-dispersing.

Evaluation of Image Deletion

Iridesse Production Press (produced by Fuji Xerox Co., Ltd.) is used to evaluate image deletion. The pressure-responsive particles is introduced into the first developing machine, and a whole-area halftone image having an image density of 50% is output, and at the same time, a whole-area halftone image having an image density of 40% is output by using a magenta toner on 1,000 sheets. The incidence of image deletion is determined in these printouts. The image deletion is evaluated by the following evaluation standard. Evaluation results are indicated in Table 2.

A: The incidence is 0% or more but less than 2%.

B: The incidence is 2% or more but less than 5%.

C: The incidence is 5% or more.

Evaluation of Transparency

The transparency is evaluated by using Iridesse Production Press (produced by Fuji Xerox Co., Ltd.). Pressure-responsive particles are loaded into a first developing machine, and an image formed of pressure-responsive particles and having an image density of 50% is formed on a transparent film (product name: PETG media film produced by PANAC Co., Ltd.). The light transmittance of a region where the image is formed is determined by the following procedure, and the transparency is evaluated on the basis of the obtained light transmittance. Evaluation results are indicated in Table 2.

Method for Measuring Light Transmittance

The light transmittance for the visible light range (400 to 700 nm) of the film is measured by using U-4100 spectrophotometer (produced by Hitachi Corporation).

Evaluation Standards

A: The light transmittance is 80% or more at 400 to 700 nm.

B: The light transmittance is 50% or more and less than 80% at 400 to 700 nm.

C: The light transmittance is less than 50% at 400 to 700 nm.

TABLE 2

| | Chromatic color toner | | | | Pressure-responsive particles | | | | | |
|---|---|---|---|---|---|---|---|---|---|---|
| | Type | D50A (μm) | Type of binder resin | Releasing agent content $W_A$ (mass %) | Type | D50B (μm) | Types of polymerization components of styrene resin | Types of polymerization components of (meth)acrylate resin | Mass ratio (styrene resin/(meth)acrylate resin) | Min Tg (° C.) |
| Example 1 | A1 | 5.0 | Polyester | 4.50 | B1 | 10.5 | St/BA/AA | 2EHA/BA | 60/40 | −50 |
| Example 2 | A1 | 5.0 | Polyester | 4.50 | B2 | 10.1 | St/BA/AA | 2EHA/BA | 77/23 | −50 |
| Example 3 | A1 | 5.0 | Polyester | 4.50 | B3 | 9.3 | St/BA/AA | 2EHA/BA | 24/76 | −50 |
| Example 4 | A1 | 5.0 | Polyester | 4.50 | B4 | 6.7 | St/BA/AA | 2EHA/BA | 60/40 | −50 |
| Example 5 | A1 | 5.0 | Polyester | 4.50 | B5 | 19.0 | St/BA/AA | 2EHA/BA | 60/40 | −50 |
| Comparative Example 1 | A1 | 5.0 | Polyester | 4.50 | B6 | 6.2 | St/BA/AA | 2EHA/BA | 60/40 | −50 |
| Example 6 | A1 | 5.0 | Polyester | 4.50 | B7 | 20.5 | St/BA/AA | 2EHA/BA | 60/40 | −50 |
| Comparative Example 2 | A1 | 5.0 | Polyester | 4.50 | B8 | 8.7 | St/BA/AA | 2EHA/BA | 83/17 | −50 |
| Example 1 | A2 | 6.2 | Styrene acryl | 4.50 | B1 | 10.5 | St/BA/AA | 2EHA/BA | 60/40 | −50 |
| Example 8 | A1 | 5.0 | Polyester | 4.50 | B9 | 9.8 | St/BA/AA | 2EHA/BA | 60/40 | −50 |
| Example 9 | A1 | 5.0 | Polyester | 4.50 | B10 | 9.7 | St/BA/AA | 2EHA/BA | 60/40 | −50 |
| Example 10 | A1 | 5.0 | Polyester | 4.50 | B11 | 10.0 | St/BA/AA | 2EHA/BA | 60/40 | −50 |
| Example 11 | A1 | 5.0 | Polyester | 4.50 | B12 | 10.1 | St/BA/AA | 2EHA/BA | 60/40 | −50 |
| Example 12 | A3 | 5.1 | Polyester | 0.25 | B13 | 8.8 | St/BA/AA | 2EHA/BA | 60/40 | −50 |
| Example 13 | A4 | 5.2 | Polyester | 0.30 | B14 | 10.2 | St/BA/AA | 2EHA/BA | 60/40 | −50 |
| Example 14 | A5 | 5.2 | Polyester | 10.00 | B15 | 9.8 | St/BA/AA | 2EHA/BA | 60/40 | −50 |
| Example 15 | A6 | 5.1 | Polyester | 11.00 | B16 | 12.0 | St/BA/AA | 2EHA/BA | 60/40 | −50 |
| Example 16 | A1 | 5.0 | Polyester | 4.50 | B17 | 10.2 | St/BA/AA | 2EHA/BA | 60/40 | −50 |
| Example 17 | A1 | 5.0 | Polyester | 4.50 | B18 | 10.2 | St/BA/AA | 2EHA/BA | 77/23 | −50 |
| Example 18 | A1 | 5.0 | Polyester | 4.50 | B19 | 9.8 | St/BA/AA | 2EHA/BA | 77/23 | −50 |
| Example 19 | A1 | 5.0 | Polyester | 4.50 | B20 | 9.5 | St/BA/AA | 2EHA/BA | 60/40 | −50 |
| Example 20 | A1 | 5.0 | Polyester | 4.50 | B21 | 10.5 | St/BA/AA | 2EHA/BA | 77/23 | −50 |
| Example 21 | A1 | 5.0 | Polyester | 4.50 | B22 | 10.1 | St/BA/AA | 2EHA/BA | 77/23 | −50 |

| | Pressure-responsive particles | | | Relationship of particles | | Evaluation | | | |
|---|---|---|---|---|---|---|---|---|---|
| | Max Tg (° C.) | Releasing agent content $W_B$ (mass %) | Presence of shell layer | D50B − D50A | Ratio ($W_B$/$W_A$) | Adhesiveness | Dispersion storage property | Image deletion | Transparency |
| Example 1 | 53 | 2.10 | Yes | 5.5 | 0.47 | A | A | A | A |
| Example 2 | 53 | 2.10 | Yes | 5.1 | 0.47 | B | A | A | A |
| Example 3 | 53 | 2.10 | Yes | 4.3 | 0.47 | A | A | A | A |
| Example 4 | 53 | 2.10 | Yes | 1.7 | 0.47 | A | A | A | A |
| Example 5 | 53 | 2.10 | Yes | 14.0 | 0.47 | B | A | B | A |
| Comparative Example 1 | 53 | 2.10 | Yes | 1.2 | 0.47 | D | A | A | A |
| Example 6 | 53 | 2.10 | Yes | 15.5 | 0.47 | A | A | C | A |
| Comparative Example 2 | 53 | 2.10 | Yes | 3.7 | 0.47 | D | A | A | A |
| Example 1 | 53 | 2.10 | Yes | 5.5 | 0.47 | B | A | A | A |
| Example 8 | 53 | 0.42 | Yes | 4.8 | 0.09 | A | A | B | A |
| Example 9 | 53 | 0.50 | Yes | 4.7 | 0.11 | B | A | B | A |
| Example 10 | 52 | 3.60 | Yes | 5.0 | 0.80 | B | A | A | A |
| Example 11 | 52 | 3.80 | Yes | 5.1 | 0.84 | C | A | A | A |
| Example 12 | 53 | 0.09 | Yes | 3.7 | 0.36 | A | A | B | A |
| Example 13 | 53 | 0.11 | Yes | 5.0 | 0.37 | B | A | B | A |
| Example 14 | 53 | 3.80 | Yes | 4.6 | 0.38 | C | A | A | A |
| Example 15 | 53 | 4.10 | Yes | 6.9 | 0.37 | C | A | B | A |
| Example 16 | 53 | 2.00 | No | 5.2 | 0.44 | A | B | B | A |
| Example 17 | 53 | 2.1 | Yes | 5.7 | 0.47 | A | A | A | A |
| Example 18 | 53 | 2.1 | Yes | 5.3 | 0.47 | A | A | B | A |
| Example 19 | 52 | 3.8 | Yes | 5 | 0.84 | B | A | A | A |
| Example 20 | 53 | 2.1 | Yes | 6 | 0.47 | A | A | A | A |
| Example 21 | 53 | 2.1 | Yes | 5.6 | 0.47 | A | B | A | B |

Abbreviations in Table 2 are as follows.

St: styrene

BA: n-butyl acrylate

AA: acrylic acid

2EHA: 2-ethylhexyl acrylate

BA: n-butyl acrylate

Min Tg (° C.): lowest glass transition temperature of pressure-responsive particles Max Tg (° C.): highest glass transition temperature of pressure-responsive particles The above-described results indicate that the particle sets for producing a printed matter of the examples can produce a printed matter that has excellent adhesiveness.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A particle set for producing a printed matter, the particle set comprising:

a chromatic color toner comprising toner particles A; and pressure-responsive particles comprising base particles B, wherein:

the pressure-responsive particles are transparent;

the base particles B comprise a styrene resin comprising, as polymerization components, styrene and a vinyl monomer other than styrene, and a (meth) acrylate resin comprising, as a polymerization component, a (meth)acrylate;

a mass ratio of the styrene resin to the (meth)acrylate resin (styrene resin:(meth)acrylate resin) is 80:20 to 20:80;

a difference between the lowest glass transition temperature and the highest glass transition temperature of the pressure-responsive particles is 30° C. or more;

the toner particles A have a volume average particle diameter D50A;

the base particles B have a volume average particle diameter D50B;

the D50A and the D50B satisfy formula 1-1 below:

$$1.5\ \mu m<(D50B-D50A); \qquad \text{formula 1-1:}$$

the toner particles A and the base particles B both comprise a releasing agent; and a ratio ($W_B/W_A$) of a releasing agent content $W_B$ in the base particles B to a releasing agent content $W_A$ in the toner particles A is 0.05 or more and 0.8 or less.

2. The particle set for producing the printed matter according to claim 1, wherein the toner particles A comprise a polyester resin.

3. The particle set for producing the printed matter according to claim 1, wherein:

the toner particles A and the base particles B both comprise a releasing agent; and a ratio ($W_B/W_A$) of a releasing agent content $W_B$ in the base particles B to a releasing agent content $W_A$ in the toner particles A is 0.09 or more and 0.8 or less.

4. The particle set for producing the printed matter according to claim 3, wherein the releasing agent content $W_B$ is 0.1 mass % or more and 4.0 mass % or less.

5. The particle set for producing the printed matter according to claim 1, wherein the D50A and the D50B satisfy formula 1-2 below:

$$1.5\ \mu m<(D50B-D50A)<10\ \mu m. \qquad \text{formula 1-2:}$$

6. The particle set for producing the printed matter according to claim 5, wherein the D50B is 6.0 μm or more and 20.0 μm or less.

7. The particle set for producing the printed matter according to claim 1, wherein the base particles B comprise:

a core comprising the styrene resin and the (meth)acrylate resin; and a shell layer that covers the core.

8. The particle set for producing the printed matter according to claim 1, wherein:

the base particles B comprise a pigment; and an amount of the pigment relative to the entirety of the base particles B is 5 ppm or more and 100 ppm or less.

9. An apparatus for producing a printed matter, the apparatus comprising:

a chromatic color toner image forming unit that stores a developer comprising the chromatic color toner in the particle set for producing the printed matter according to claim 1, and that is configured to electrophotographically form a chromatic color toner image on a recording medium by using the developer;

an applying unit that stores the pressure-responsive particles in the particle set for producing the printed matter according to claim 1 and that is configured to apply the pressure-responsive particles to the recording medium to form a pressure-responsive particle layer;

a thermal fixing unit that is equipped with a fixing member and that is configured to thermally fix the chromatic color toner image onto the recording medium while the fixing member is in contact with the pressure-responsive particle layer; and a pressure bonding unit configured to fold the recording medium having the chromatic color toner image thermally fixed thereon, and to pressure-bond the folded recording medium, or configured to stack another recording medium on top of the recording medium having the chromatic color toner image thermally fixed thereon, and to pressure-bond the stacked recording media.

10. A method for producing a printed matter, the method comprising:

electrophotographically forming a chromatic color toner image on a recording medium by using a developer that contains the chromatic color toner in the particle set for producing the printed matter according to claim 1;

forming a pressure-responsive particle layer by applying, to the recording medium, the pressure-responsive particles in the particle set for producing the printed matter according to claim 1;

thermally fixing the chromatic color toner image onto the recording medium while a fixing member is in contact with the pressure-responsive particle layer; and folding the recording medium having the chromatic color toner image thermally fixed thereon, and pressure-bonding the folded recording medium, or stacking another recording medium on top of the recording medium having the chromatic color toner image thermally fixed thereon, and pressure-bonding the stacked recording media.

* * * * *